US010926690B2

(12) United States Patent
Tanabe et al.

(10) Patent No.: US 10,926,690 B2
(45) Date of Patent: Feb. 23, 2021

(54) VEHICLE BODY FRONT STRUCTURE

(71) Applicant: HONDA MOTOR CO., LTD., Tokyo (JP)

(72) Inventors: Shinya Tanabe, Wako (JP); Takafumi Miki, Wako (JP); Yoshitaka Hirose, Wako (JP); Masayoshi Takori, Wako (JP); Toshiaki Ohnuki, Utsunomiya (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 16/568,934

(22) Filed: Sep. 12, 2019

(65) Prior Publication Data

US 2020/0094729 A1 Mar. 26, 2020

(30) Foreign Application Priority Data

Sep. 26, 2018 (JP) .............................. JP2018-179731

(51) Int. Cl.
*B60Q 1/04* (2006.01)
*B62D 25/08* (2006.01)
(Continued)

(52) U.S. Cl.
CPC ........... *B60Q 1/0483* (2013.01); *B60Q 1/045* (2013.01); *B60Q 1/0441* (2013.01);
(Continued)

(58) Field of Classification Search
CPC .... B60Q 1/0483; B60Q 1/045; B60Q 1/0441; B60Q 1/0433; B60Q 1/0408;
(Continued)

(56) References Cited

U.S. PATENT DOCUMENTS

| | | | |
|---|---|---|---|
| 2013/0021814 A1* | 1/2013 | Tanaka | B60Q 1/0408 362/496 |
| 2013/0026772 A1* | 1/2013 | Huber | B62D 25/084 293/102 |

(Continued)

FOREIGN PATENT DOCUMENTS

| | | |
|---|---|---|
| JP | S56154274 U | 11/1981 |
| JP | 2005088727 A | 4/2005 |

(Continued)

OTHER PUBLICATIONS

Notice of Reasons for Refusal for Japanese Patent Application No. 2018-179731, dated Mar. 13, 2020; 14 pp.

*Primary Examiner* — Kevin Quarterman

(74) *Attorney, Agent, or Firm* — Armstrong Teasdale LLP

(57) ABSTRACT

In a vehicle body front structure, including a front hood (10) covering a front space (3) defined in a front part of a vehicle body (4) from above, a front panel (13) laterally extending along and under a front edge of the front hood and facing substantially in a fore and aft direction, the front panel defining an opening (13A) in an outboard part thereof, and a headlight (12) attached to the vehicle body and facing the opening of the front panel from behind the front panel, the headlight is attached to a rear side of the front panel via a bracket (40) which is positionally fixed to a periphery of the opening.

19 Claims, 15 Drawing Sheets

(51) Int. Cl.
  *B62D 25/10* (2006.01)
  *B62D 25/02* (2006.01)
  *B62D 27/02* (2006.01)

(52) U.S. Cl.
  CPC ......... *B62D 25/025* (2013.01); *B62D 25/085* (2013.01); *B62D 25/105* (2013.01); *B62D 27/023* (2013.01)

(58) Field of Classification Search
  CPC .. B62D 25/085; B62D 25/105; B62D 25/025; B62D 27/023
  See application file for complete search history.

(56) References Cited

U.S. PATENT DOCUMENTS

| | | | |
|---|---|---|---|
| 2018/0029524 A1* | 2/2018 | Niessen | B60Q 1/045 |
| 2018/0056909 A1* | 3/2018 | Sedique | B60R 19/50 |
| 2018/0086384 A1* | 3/2018 | DeVoe | B60Q 1/0483 |
| 2018/0186277 A1* | 7/2018 | Glickman | F21S 45/10 |
| 2018/0297507 A1* | 10/2018 | Patak | B33Y 10/00 |

FOREIGN PATENT DOCUMENTS

| | | |
|---|---|---|
| JP | 2011016386 A | 1/2011 |
| JP | 201451140 A | 3/2014 |
| JP | 2014184793 A | 10/2014 |

* cited by examiner

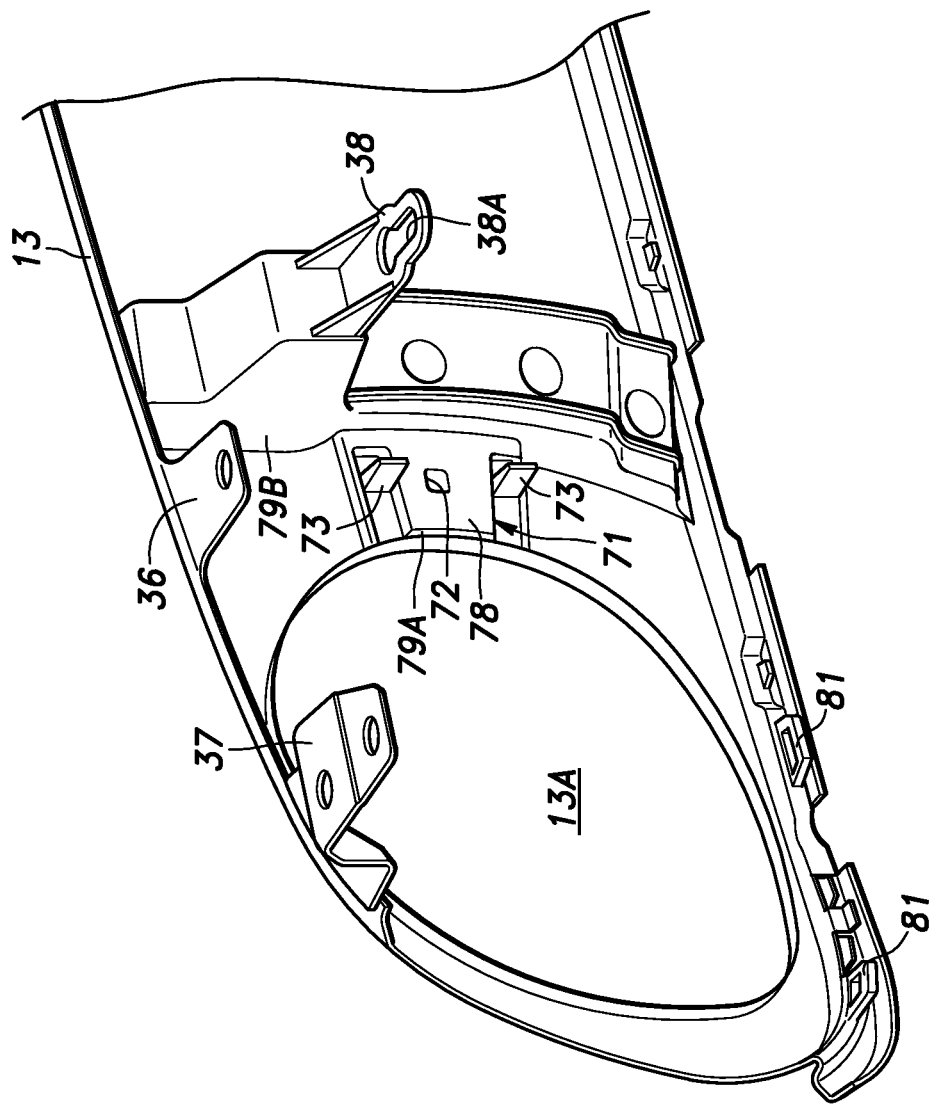

VEHICLE BODY FRONT STRUCTURE

TECHNICAL FIELD

The present invention relates to a vehicle body front structure in which a headlight is located inward of an opening formed in a front panel.

BACKGROUND ART

A known vehicle body front structure includes a pair of front fenders, a front bumper face, a front grille and an engine hood. See JP2014-51140A. In this vehicle body front structure, a front opening is defined by the engine hood, the front fenders and the bumper face, and the front grille is fitted into this front opening. A pair of circular holes are formed on either lateral end of the grille to receive headlights therein. In other words, the headlights are each surrounded by the grille so that an attractive appearance can be created.

In this conventional structure, the headlights are first fixed to the vehicle body, and the front grille is then attached to the vehicle body. In the assembly process, it is necessary to properly position the front grille so that the headlights are each centrally positioned relative to the peripheral edge of the hole in the grille. A slight offset in the position of the headlights relative to the holes can seriously impair the external appearance.

SUMMARY OF THE INVENTION

In view of such a problem of the prior art, a primary object of the present invention is to provide a vehicle body front structure which allows a headlight and a front grille or a front panel to be assembled properly in an efficient manner.

A second object of the present invention is to provide a vehicle body front structure that allows headlights and a front grille or a front panel to be fixed to the vehicle body in a stable manner without complicating the assembling process.

To achieve such objects, one embodiment of the present invention provides a vehicle body front structure, including a front hood (10) covering a front space (3) defined in a front part of a vehicle body (4) from above, a front panel (13) laterally extending along and under a front edge of the front hood and facing substantially in a fore and aft direction, the front panel defining an opening (13A) in an outboard part thereof, and a headlight (12) facing the opening of the front panel from behind the front panel, wherein the headlight is attached to a rear side of the front panel via a bracket (40) which is positionally fixed to a periphery of the opening.

Since the headlight can be fixed to the front panel before the front panel is attached to the vehicle body, a correct positional relationship between the headlight and the front panel can be ensured. The headlight and the front panel may be attached to selected parts of the vehicle body so that the headlight and the front panel can be firmly fixed to the vehicle body without complicating the assembly process.

Preferably, the bracket is provided with a positioning pin (76) projecting forward, and an engagement hole (77) which is open toward front and located adjacent to the positioning pin, and a rear side of the front panel is provided with a pedestal (71) having a positioning hole (72) configured to receive the positioning pin, and an engagement claw (73) projecting rearward into the engagement hole to be engaged by the bracket.

The pedestal may consist of a feature provided as an additional part to the generally plate-like front panel so that the positioning hole may be formed without creating any projection or hole which may be visible from the front. Owing to the engagement between the positioning pin and the positioning hole, the bracket can be correctly positioned relative to the front panel at a high precision. Owing to the engagement between the engagement hole and the engagement claw, the bracket (and the headlight which is relatively heavy) can be firmly and stably attached to the front panel.

Preferably, an upper part of the front panel is provided with a first projecting piece (36) projecting rearward along an upper surface of the bracket to be secured to the bracket.

Thereby, an upper part of the bracket can be correctly positioned to and fixed to the front panel in a secure manner.

Preferably, a lower part of the front panel is provided with a claw (81) projecting rearward, and the bracket is provided with an engagement feature (82) configured to be engaged by the claw.

Thereby, a lower part of the bracket can be correctly positioned to and fixed to the front panel in a secure manner.

Preferably, an upper part of the front panel on an outboard side of the first projecting piece is provided with a second projecting piece (37) extending rearward along an upper surface of the headlight to be secure to the headlight.

Thereby, the upper part of the headlight can be correctly positioned to and directly fixed to the front panel in a secure manner.

Preferably, the bracket is provided with a headlight support portion (41) positioned on a periphery of a front part of the headlight, and an upper arm (44) extending rearward from an upper part of the headlight support portion, the upper arm being positioned onto the upper surface of the headlight to be fixed thereto.

Thereby, the upper part of the headlight can be correctly positioned to and fixed to the bracket in a secure manner.

Preferably, the bracket is provided with a headlight support portion (41) positioned on a periphery of a front part of the headlight, and a lower arm (45) extending rearward from a lower part of the headlight support portion, the lower arm being positioned onto a lower surface of the headlight to be fixed thereto.

Thereby, the lower part of the headlight can be correctly positioned to and fixed to the bracket in a secure manner.

Preferably, the bracket is provided with a headlight support portion (41) positioned on a periphery of a front part of the headlight, and an outer arm (49) extending rearward from an outboard part of the headlight support portion, the outer arm being provided with a claw (49A) configured to engage a tongue (51) projecting from a side of the headlight.

Thereby, the outboard part of the headlight can be correctly positioned to and fixed to the bracket via the outer arm of the bracket in a secure manner.

Preferably, an upper part of the front panel is provided with a third projecting piece (38) projecting rearward to be fixed to the vehicle body.

Thereby, the upper part of the front panel can be correctly positioned to and fixed to the vehicle body in a secure manner. The third projecting piece may be provided on an inboard side of the headlight with respect to the first projection.

Preferably, a lower part of the bracket on an inboard side of the headlight is provided with an inner leg (50) projecting rearward to be fixed to a vertical member (33) of a front bulkhead (22) of the vehicle body formed as a frame structure.

Thereby, after the headlight is attached to the front panel, the bracket can be correctly positioned to and fixed to the vehicle body via the inner leg in a secure manner.

Preferably, a lower part of the bracket on an outboard side of the headlight is provided with an outer leg (46) projecting rearward to be fixed to an inner surface of a front fender (9) of the vehicle body via a fender bracket (52).

Thereby, the lower outboard part of the bracket can be correctly positioned to and fixed to the front fender via the outer leg.

Preferably, the third projecting piece of the front panel is formed with a slot (38A) for permitting positional adjustment of the front panel relative to the vehicle body.

Thereby, the front panel can be attached to the vehicle body in an adjustable manner so that the assembly process is facilitated, and the positional accuracy of the front panel can be ensured.

Preferably, an upper part of the headlight is provided with an inner fixing portion (54) and an outer fixing portion (56) for fixing the headlight to the vehicle body, the outer fixing portion being positioned higher than the inner fixing portion.

Thereby, the headlight can be correctly positioned to and directly fixed to the vehicle body in a secure manner. The rotation of the headlight, in particular around a fore and aft axial line, can be effectively prevented. Also, the placement of the headlight in relation to the front panel from the outboard direction can be facilitated.

Preferably, the pedestal includes a pedestal plate (78) extending along a rear surface of the front panel, and a connecting wall (79) connecting the pedestal plate to the front panel.

Typically, the pedestal plate is spaced from the rear surface of the front panel so that the locating pin of the bracket can be inserted into the locating hole formed in the pedestal plate without being interfered by the main body of the front panel. Also, the presence of the pedestal does not prevent the front panel from being formed by injection molding.

Preferably, the bracket has a substantially L shape in front view, and a substantially channel shape having an open side facing rearward in side view.

Thereby, the placement of the headlight in relation to the front panel from the outboard direction can be facilitated while the headlight can be fixed to the bracket at the upper and lower parts thereof in a highly secure manner.

According to another aspect of the present invention, the bracket comprises a lateral support portion (43) extending along a lower side of the opening and a vertical support portion (42) extending vertically upward from the lateral support portion so as to extend along an inboard side of the opening, wherein the bracket is fixed to the front panel at the lateral support portion and the vertical support portion.

Thereby, the headlight can be surrounded by the bracket along two sides thereof for secure attached to the bracket, and the placement of the headlight in the prescribed position from the outboard direction is facilitated even after the bracket is fixed to the front panel beforehand.

Preferably, the bracket further comprise an upper arm (44) extending rearward from an upper end of the vertical support portion and a lower arm (45) extending rearward from the lateral support portion, a rear end of the upper arm is fixed to an upper side of the headlight, and the lower arm is fixed to a lower side of the headlight via a fastener (68, 84) having a vertical axial line.

Thereby, the lower part of the headlight can be firmly and correctly positioned to the lateral support portion of the bracket. This also simplifies the assembly process.

Preferably, the front panel is provided with a first projecting piece (36) projecting rearward from an upper part thereof to be fixed to the upper arm.

Thereby, the upper part of the headlight can be correctly positioned to and firmly fixed to both the bracket and the front panel.

Preferably, the front panel is provided with a second projecting piece (37) projecting rearward from an upper part thereof on an outboard side of the first projecting piece to be fixed to the headlight and the vehicle body.

Thereby, the upper and outboard part of the headlight can be correctly positioned to and firmly fixed to the vehicle body and the front panel.

Preferably, the front panel is provided with a third projecting piece (38) projecting rearward from an upper part thereof on an inboard side of the first projecting piece to be fixed to the vehicle body.

Thereby, the part of the front panel adjoining the upper and inboard part of the headlight can be correctly positioned to and firmly fixed to the vehicle body.

The present invention thus provides a vehicle body front structure which allows a headlight and a front panel to be assembled properly in an efficient manner. This vehicle body front structure also allows headlights and a front panel to be fixed to the vehicle body in a stable manner without complicating the assembling process.

BRIEF DESCRIPTION OF THE DRAWINGS

FIG. 11 is a perspective rear view of the front panel;

DESCRIPTION OF THE PREFERRED EMBODIMENTS

A vehicle body front structure according to an embodiment of the present invention is described in the following with reference to the appended drawings. Since the vehicle body front structure of the illustrated embodiment is essentially symmetric about the longitudinal center line of the vehicle body, only one side of the vehicle body front structure may be discussed in the following to avoid redundancy. In the illustrated embodiment, a pair of headlights are provided on the front panel of the vehicle, but the present invention is equally applicable to cases where only one headlight is provided or three or more headlights are provided.

Figure 1:
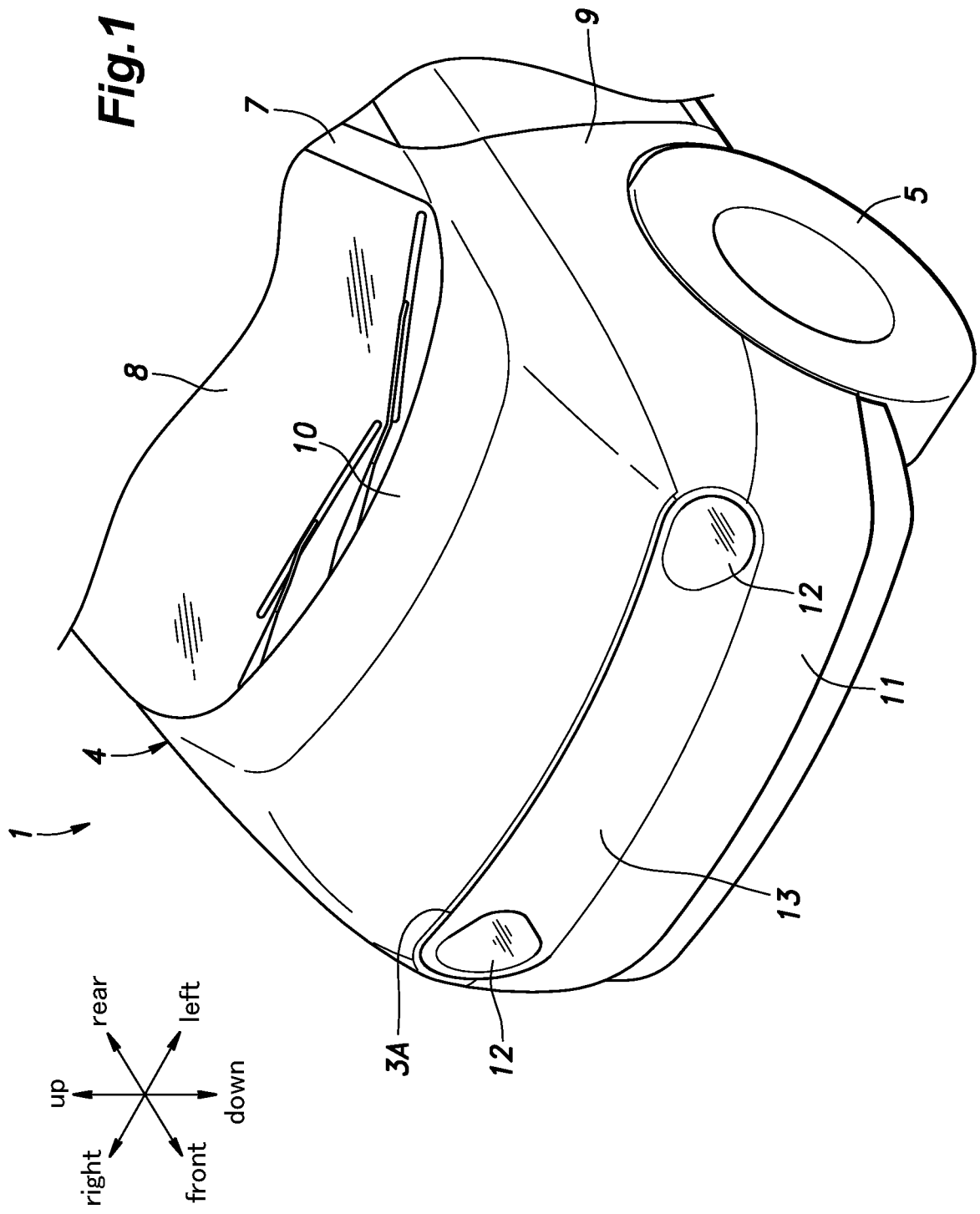
FIG. 1 is a perspective view of a front part of a vehicle body according to an embodiment of the present invention.

FIG. 1 is a perspective view of a front part of a vehicle 1 according to an embodiment of the present invention. As shown in FIG. 1, the vehicle 1 includes a vehicle body 4 defining a cabin and a front space 3 (which typically, but not exclusively, serves as a space for accommodating a power source such as an electric motor, or a space for accommodating cargo and other objects) disposed in front of the cabin, a pair of front wheels 5, and a pair of rear (not shown in the drawings). The vehicle body 4 has a pair of front pillars 7 on either side of thereof, and a front windshield 8 provided between the left and right front pillars 7. Further, the vehicle body 4 is provided with a pair of front fenders 9 extending in a fore and aft direction on either side of the front space 3, and a hood 10 selectively covering an upper opening 3A of the front space 3 by being hinged to a suitable part of the vehicle body 4 at the rear end thereof.

The front ends of the front fenders 9 are connected to a bumper beam which is covered by a front bumper face 11 on the front side thereof. A front panel 13 is attached to the vehicle body 4 so as to be positioned immediately above the bumper face 11, and to create a pleasing front view of the vehicle in cooperation with the front bumper face 11. The structural members for the front part of the vehicle body 4 are collectively referred to as a frame structure 20 (FIG. 2) in the following disclosure. The front panel 13 is formed with a pair of circular openings 13A, and a pair of headlights 12 are positioned behind the front panel 13 so as to face the respective openings 13A from behind the front panel 13. The front end of the front space upper opening 3A is defined by the front panel 13, and the rear end of the front space upper opening 3A is defined by a dashboard 14 (bulkhead, see FIG. 2) that separates the cabin and the front space 3 from each other.

The front fenders 9, the front hood 10, and the frame structure 20 of the vehicle body 4 are generally made of stamp formed sheet steel. The front bumper face 11 and the front panel 13 are made of injection molded plastic members. In the illustrated embodiment, the front panel 13 consists of a substantially planar plate member, but may also consist of a skeletal structure typically referred to as a front grille.

Figure 2:
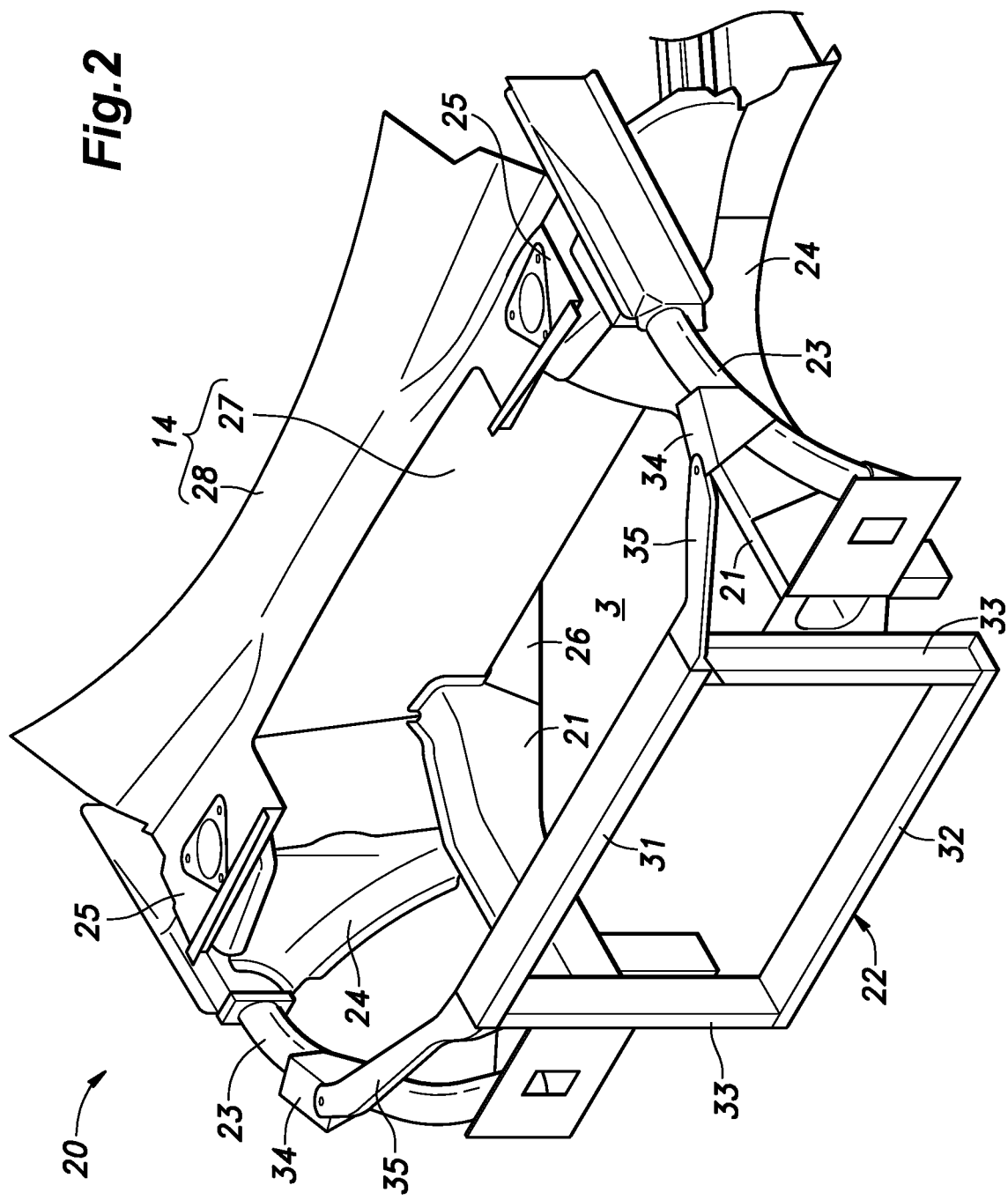
FIG. 2 is a perspective view of a frame structure of the front part of the vehicle body.

FIG. 2 is a perspective view of the frame structure 20 in the front part of the vehicle body. As shown in FIG. 2, the frame structure 20 of the vehicle body 4 includes a pair of front side members 21 extending in the fore and aft direction on either side of the front space 3. A front bulkhead 22 consisting of a frame member having a rectangular shape in front view is connected to the front ends of the front side members 21. A pair of upper members 23 extend in the fore and aft direction on either side of the front space 3 above and outboard of the respective front side members 21. The front end part of each upper member 23 extends obliquely downward toward the front, and is connected to the corresponding front side member 21. The rear end of each upper member 23 is connected to a corresponding front wheel house 24 and a corresponding front damper housing 25. The rear end of each front side member 21 is connected to a corresponding front floor panel via a side frame rear end 26. The dashboard 14 consists of a dashboard lower 27 and a dashboard upper 28, and the dashboard lower 27 is connected to the front side members 21.

The front bulkhead 22 includes an upper cross member 31 and a lower cross member 32 extending in the lateral direction, and a pair of vertical members 33 extending in the vertical direction, and connecting the respective ends of the upper cross member 31 and the lower cross member 32. The front bulkhead 22 is joined to the front ends of the front side members 21 at vertically intermediate points of the vertical members 33. An intermediate point of the upper member 23 is provided with a mounting member 34 fixedly secured thereto, and each lateral end of the upper cross member 31 is connected to the mounting member 34 via a connecting member 35.

Figure 3:
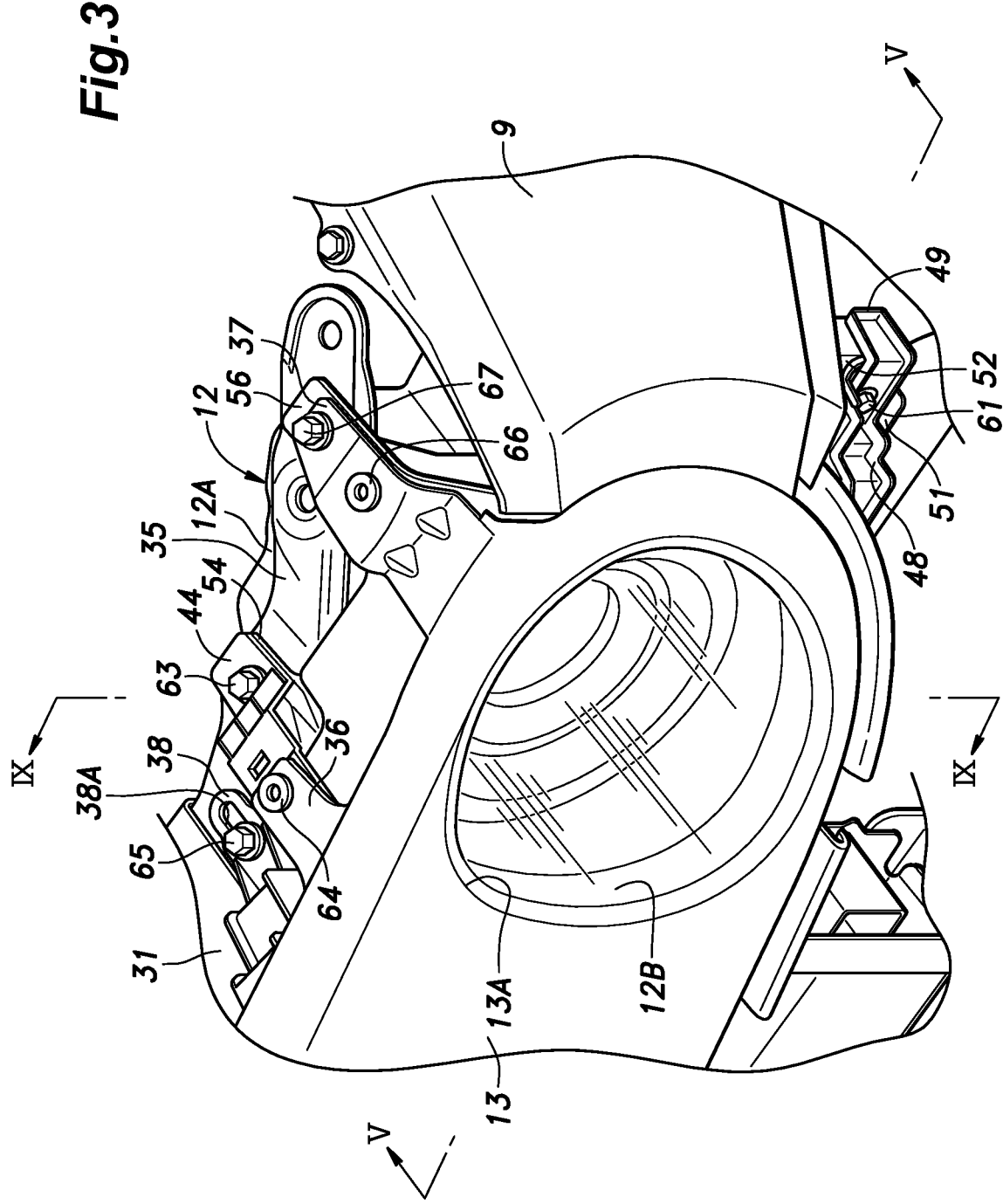
FIG. 3 is a perspective view of a structure surrounding a headlight as viewed from above.

FIG. 3 is a perspective view of a part surrounding the headlight 12 with the front hood 10 opened. In FIG. 3, only a selected part of the vehicle body 4 is shown while the upper member 23, the mounting member 34, the front bumper face 11 and the like are not shown. The headlight 12 includes a main body 12A and a lens 12B. The main body 12A of the headlight 12 is attached to the front panel 13 with the lens 12B fitted in the opening 13A. The mounting structure for the headlight 12 is described in the following in greater detail.

An upper part of the front panel 13 is integrally provided with a first projecting piece 36, a second projecting piece 37, and a third projecting piece 38 extending rearward. The first projecting piece 36 is provided somewhat inboard of the center of the opening 13A, and extends generally horizontally rearward from the upper edge of the front panel 13. The second projecting piece 37 is provided in an outboard end part of the front panel 13 (aligning with an outboard end part of the headlight 12), and extends generally horizontally rearward from the upper edge of the front panel 13. An intermediate part of the second projecting piece 37 is provided with a step so that the rear end part thereof is located higher than the front end part thereof, and the rear end part and the front end part extend in parallel to each other. The third projecting piece 38 is provided somewhat more inboard than the first projecting piece 36, and extends generally horizontally rearward from the upper edge of the front panel 13. The third projecting piece 38 is also provided with a step in an intermediate point thereof so that the rear end part thereof is located lower than the front end part thereof, and extends horizontally.

Figure 4:
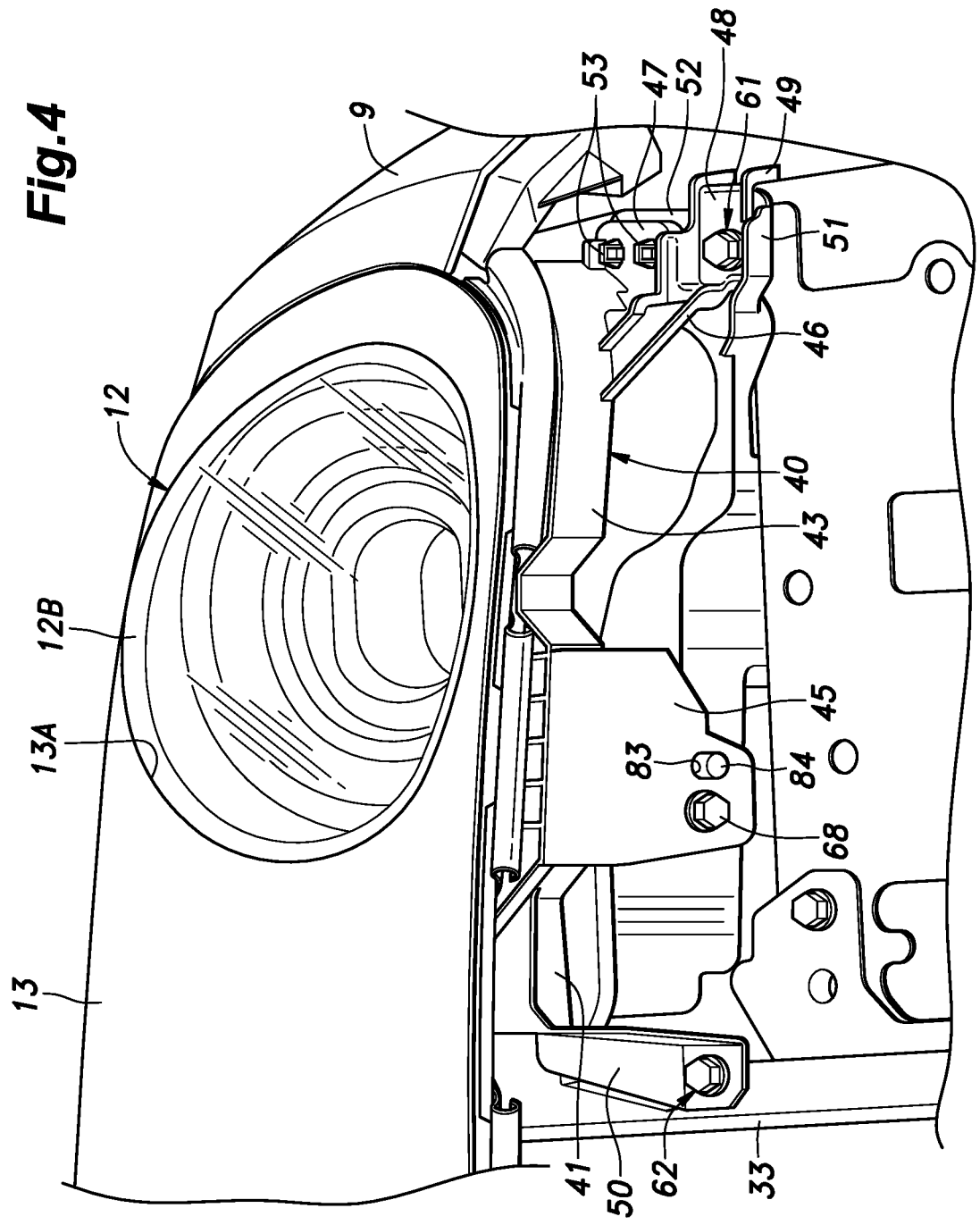
FIG. 4 is a perspective view of the structure surrounding the headlight as viewed from below.

FIG. 4 is a perspective view of a part surrounding the headlight 12 as viewed obliquely from below. Only a part of the vehicle body 4 is shown in FIG. 4, and the front bumper face 11 and the like are omitted from the illustration. As shown in FIG. 4, the lower part of the front panel 13 is not provided with any rearwardly projecting piece. Behind the front panel 13, a bracket 40 for supporting the headlight 12 is provided. The headlight 12 is attached to the front panel 13 via the bracket 40.

Figure 5:
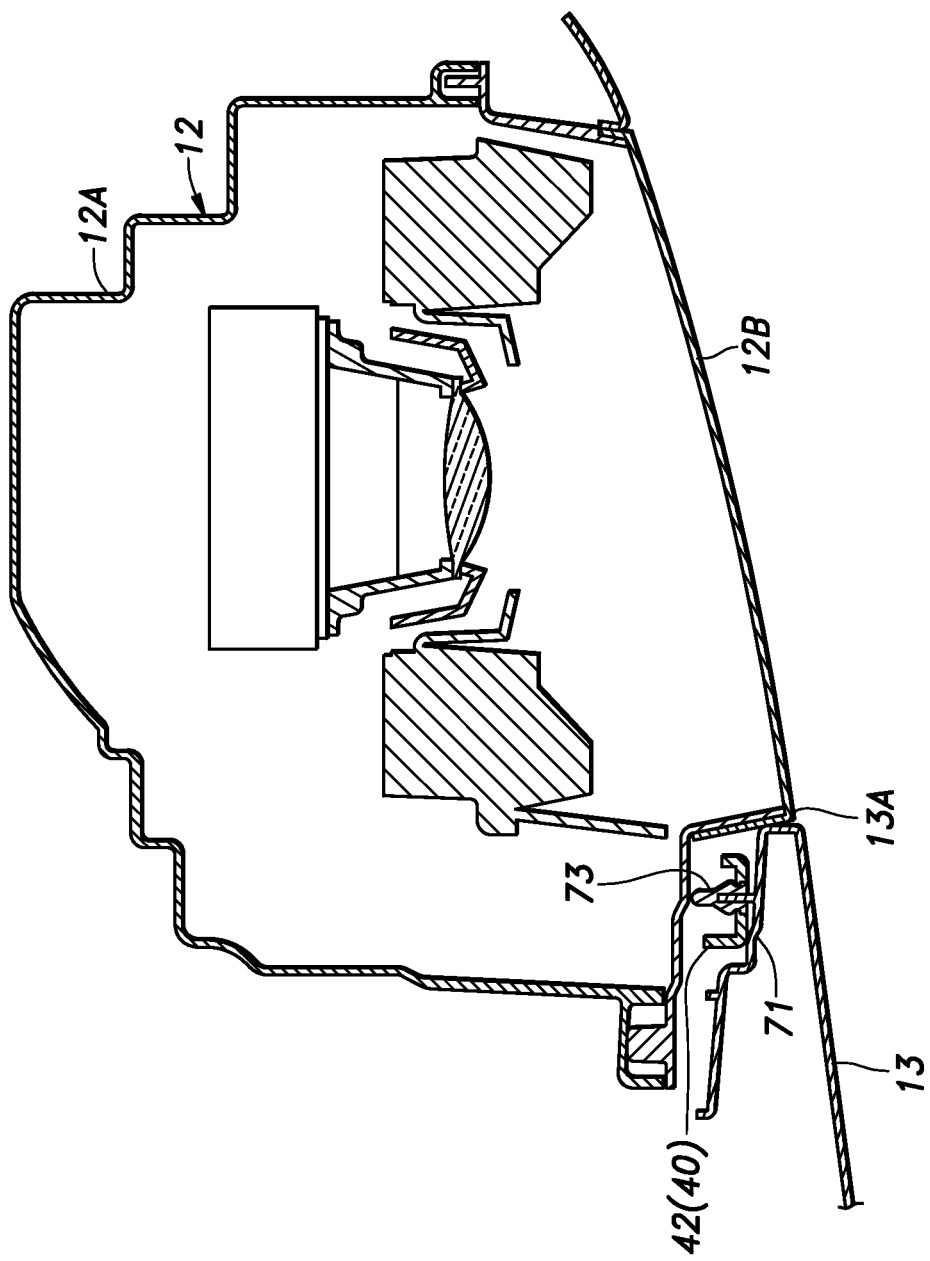
FIG. 5 is a sectional view taken along line V-V in FIG. 3.

FIG. 5 is a sectional view taken along line V-V in FIG. 3. As shown in FIG. 5, the main body 12A of the headlight 12 is a module including a light projection unit formed by a light source, a lens, and a reflector, and a case for housing the light projection unit therein. The case includes a front half and a rear half that are formed by injection molding of resin, and are joined to each other. The front half defines a substantially circular opening in front of the reflector. The lens 12B of the headlight 12 consists of a transparent disk member formed by injection molding resin, and is attached to the main body 12A by being fitted into the circular opening defined in the front end part of the front half of the case. The headlight 12 is mounted to the front panel 13 via the bracket 40 that supports the main body 12A in such a manner that the lens 12B is received in the opening 13A of the front panel 13, and the outer surface of the lens 12B is substantially flush with the front surface of the front panel 13.

Figure 6:
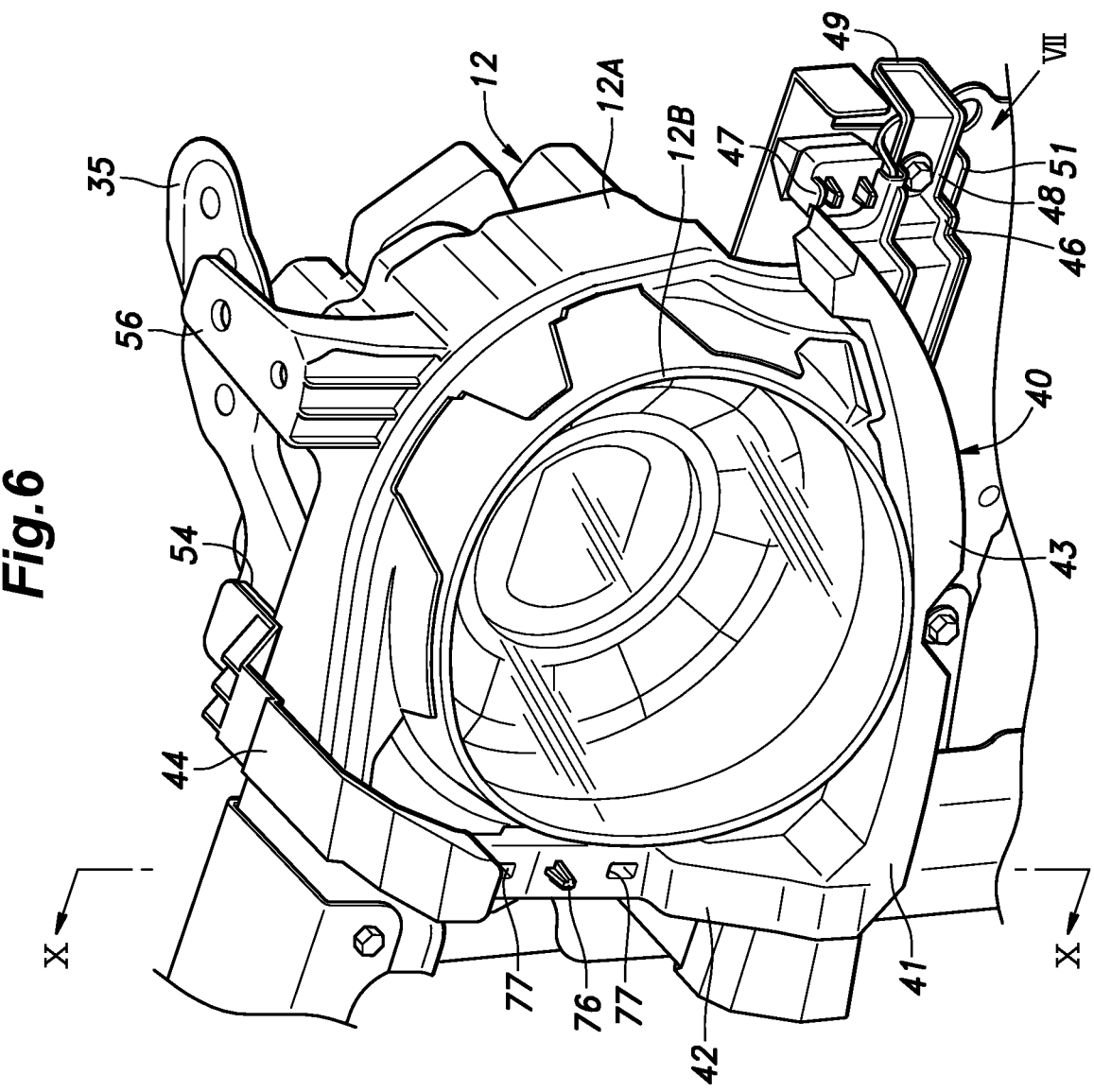
FIG. 6 is a perspective view of the part surrounding the headlight with a front panel removed.

FIG. 6 is a perspective view of the part surrounding the headlight 12 with the front panel 13 removed for the convenience of illustration. The bracket 40 is an injection molded resin member, and includes a headlight support portion 41 for supporting the headlight 12. The headlight support portion 41 includes a vertical support portion 42 extending vertically on the inboard side of the headlight 12 and a lateral support portion 43 extending laterally under the headlight 12. The lateral support portion 43 extends outward from the lower end of the vertical support portion 42 so that the bracket 40 has a substantially L shape in front view (see FIG. 13).

An upper arm 44 extends integrally rearward from an upper part of the headlight support portion 41 (the upper end of the vertical support portion 42) along an inboard side and above the headlight 12. As also shown in FIG. 4, a lower arm 45 formed as a plate piece extending substantially horizontally extends integrally rearward from a lower part of the headlight support portion 41 (an intermediate point of the lateral support portion 42) along an inboard side of and below the headlight 12. The lower arm 45 is substantially aligned with the upper arm 44 in the vertical direction, and the bracket 40 has a substantially channel shape (C shape) in side view, with the upper arm 44 and the lower arm 45 facing each other (see FIG. 13).

Figure 7:
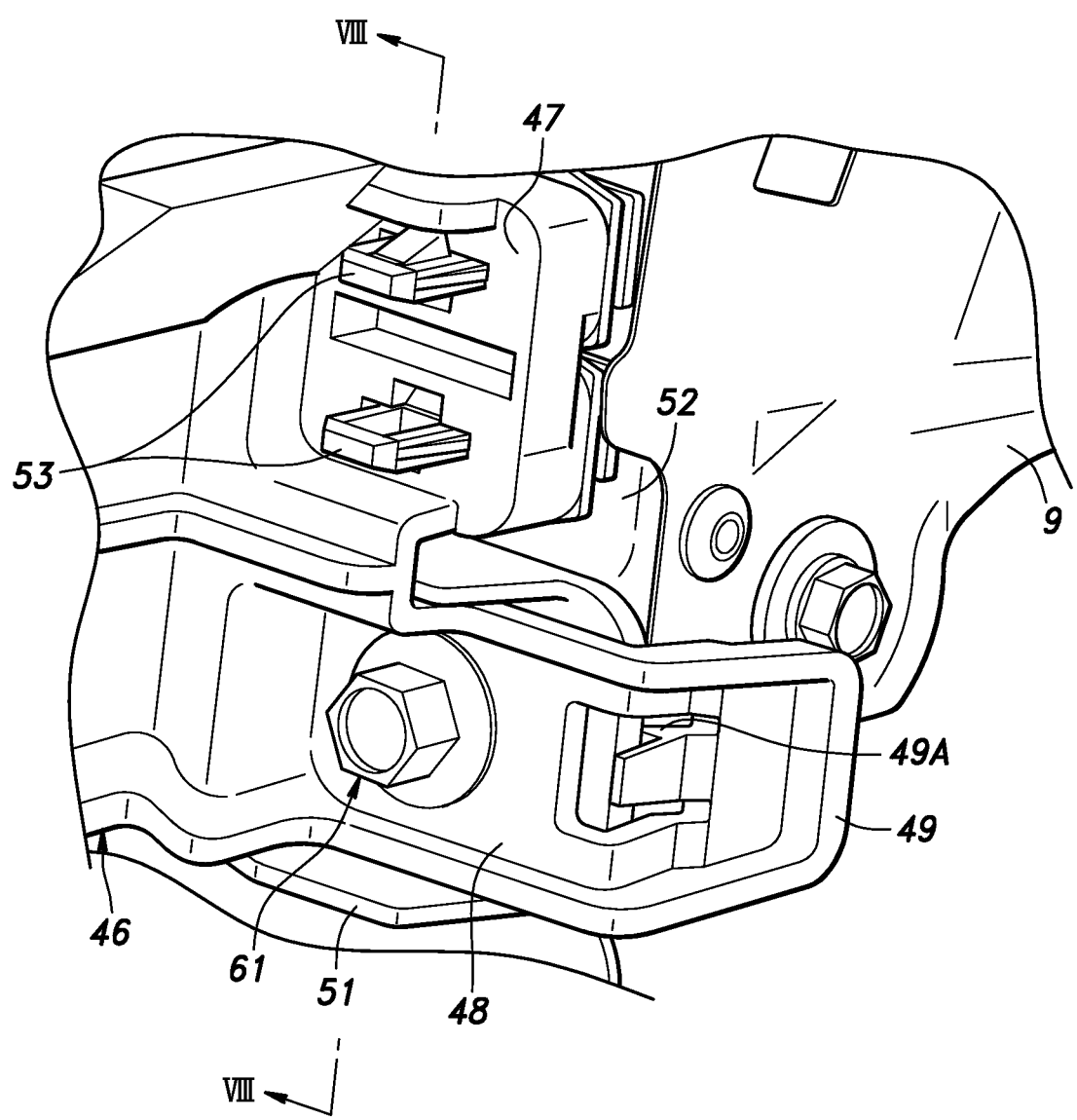
FIG. 7 is a perspective view showing a lower part of a mounting structure of the headlight as viewed from a direction indicated by Roman numeral VII in FIG. 6.

A lower outboard end of the headlight support portion 41 (an outboard end of the lateral support portion 43) is integrally formed with an outer leg 46 which extends rearward along an outboard and lower side of the headlight 12. FIG. 7 is a perspective view showing a lower part of a mounting structure of the headlight 12 as viewed from the direction indicated by Roman numeral VII in FIG. 6. As shown in FIGS. 6 and 7, the outer leg 46 includes an outer upper leg 47 and an outer lower leg 48 that project rearward from the rear end thereof. An outer arm 49 projects rearward from an outboard end of the outer lower leg 48. The outer arm 49 is resiliently deflectable in the lateral direction, and is provided with a claw 49A that projects from the inboard surface thereof.

Figure 8:
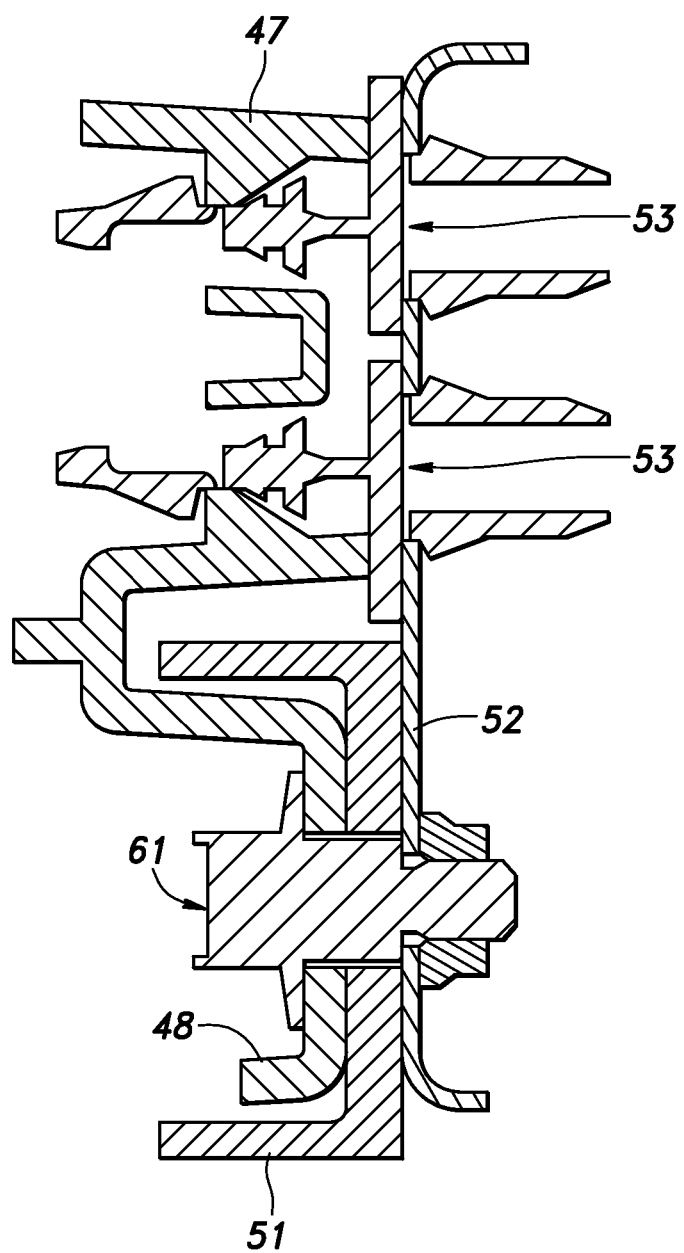
FIG. 8 is a sectional view taken along line VIII-VIII in FIG. 7.

As best shown in FIGS. 7 and 8, a tongue 51 extends from a lower part of the outboard side of the case of the headlight 12 in the outboard direction. The tongue 51 is provided with a pair of rearward extending flanges along the upper and lower edges thereof, respectively, so as to define a channel-shaped cross section having an open side facing forward.

As shown in FIGS. 4 and 7, a fender bracket 52 is attached to the inner surface of the front fender 9. FIG. 8 is a sectional view taken along line VIII-VIII in FIG. 7. As shown in FIGS. 7 and 8, the fender bracket 52 is provided with a mounting surface facing forward, and a pair of claws 53 project forward from an upper part of the mounting surface.

The outer lower leg 48 is fixed to the fender bracket 52 by a first fastener 61 with the tongue 51 interposed between the fender bracket 52 and the outer lower leg 48. In the illustrated embodiment, the first fastener 61 consists of a welded nut welded to the rear surface of the fender bracket 52 and a threaded bolt threaded into the welded nut. The first fastener 61 thus has an axial line extending in the fore and aft direction.

As shown in FIG. 7, the outer upper leg 47 of the bracket 40 is provided with a pair of holes configured to receive the two claws 53 projecting from the mounting surface of the fender bracket 52, and is fixed to the fender bracket 52 by the claws 53 engaged by the holes. The claws 53 may be attached to either the outer upper leg 47 or the fender bracket 52 before the outer upper leg 47 is fixed to the fender bracket 52.

The outer arm 49 extends rearward from the outboard end of the outer lower leg 48 along the outboard edge of the tongue 51, and the claw 49A thereof engages the outboard edge of the tongue 51. Thus, the outer lower leg 48 is received by the channel defined by the tongue 51 from the front, and the claw 49A of the outer arm 49 engages the tongue 51 in such a manner that the lower outboard part of the headlight 12 is retained by the bracket 40. In this state, the threaded bolt of the first fastener 61 is passed through the hole in the outer lower leg 48, and the hole in the tongue 51 to be threaded into the welded nut welded to the fender bracket 52.

As shown in FIG. 4, an inner leg 50 extends integrally rearward from a lower inboard end of the headlight support portion 41 (inboard end of the lateral support portion 43). The rear end of the inner leg 50 is fixed to the front surface of the corresponding vertical member 33 of the front bulkhead 22 via a second fastener 62 which may consist of a welded nut welded to the rear surface of the vertical member and a threaded bolt threaded into the welded nut. The second fastener 62 thus has an axial line extending in the fore and aft direction.

Figure 9:
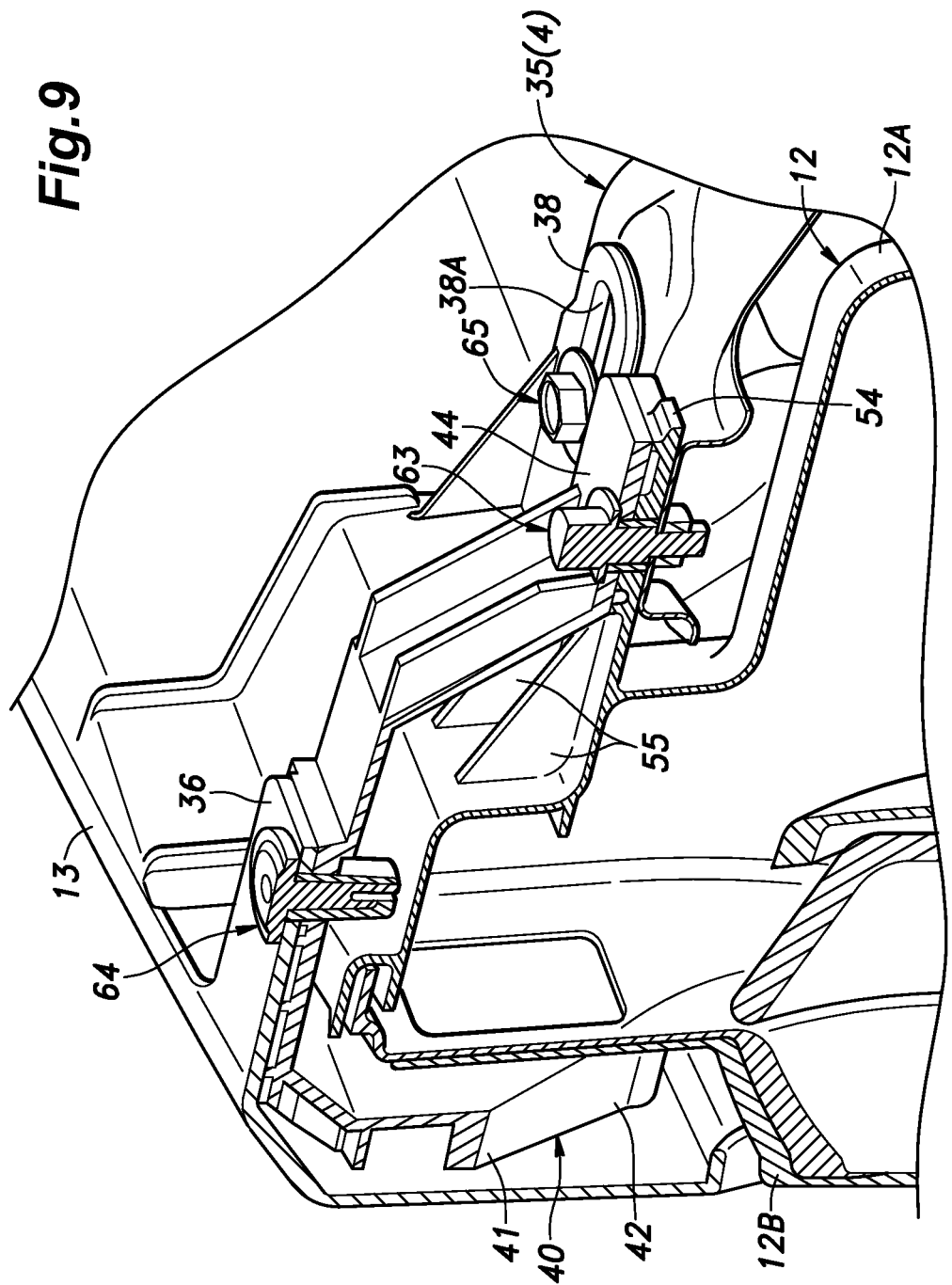
FIG. 9 is a sectional perspective view of an upper part of the mounting structure of the headlight taken along line IX-IX in FIG. 3 as viewed from the rear.

FIG. 9 is a sectional perspective view of an upper part of the mounting structure of the headlight 12 taken along line IX-IX of FIG. 3 as viewed from the rear. As shown in FIGS. 3 and 9, the upper arm 44 of the bracket 40 is positioned directly under and in contact with the first projecting piece 36. In particular, the upper arm 44 includes a base end part extending rearward from the headlight support portion 41, an intermediate part bent downward toward the rear, and a free end part extending rearward from the rear end of the intermediate part, and the first projecting piece 36 is positioned on or rests upon the upper surface of the base end part of the upper arm 44.

The case of the headlight 12 is provided with an inner fixing portion 54 at a part thereof corresponding to the upper arm 44 with respect to the lateral direction. The inner fixing portion 54 extends rearward directly and immediately under the free end part (rear end part) of the upper arm 44. The inner fixing portion 54 and a vertical wall of an upper front part of the headlight 12 are connected to each other by a pair of substantially triangular reinforcing ribs 55. The reinforcing ribs 55 are located so as to correspond to the intermediate part of the upper arm 44 and restrict the rearward movement of the headlight 12 (the inner fixing portion 54) relative to the bracket 40 (the upper arm 44).

As shown in FIG. 3, the headlight 12 is provided with an outer fixing portion 56 in a part thereof corresponding to the second projecting piece 37 of the front panel 13 with respect to the lateral direction. The outer fixing portion 56 projects upward and is bent rearward so that the rear end part of the outer fixing portion 56 is placed directly and immediately under the second projecting piece 37.

As shown in FIGS. 3 and 9, the rear end part of upper arm 44 of the bracket 40 is connected to the connecting member 35 via a third fastener 63 with the inner fixing portion 54 interposed between the upper arm 44 and the connecting member 35 of the vehicle body 4. In the illustrated embodiment, the third fastener 63 includes welded nut welded to the lower surface of the connecting member 35 and a threaded bolt threaded into the welded nut. The third fastener 63 thus has an axial line extending vertically. The upper arm 44 of the bracket 40 is fixed to the vehicle body 4 after being properly positioned on the inner fixing portion 54 which is located on the upper surface of the headlight 12. The details of this positioning process will be described later.

The first projecting piece 36 of the front panel 13 is fixed to the upper arm 44 of the bracket 40 by a fourth fastener 64 at the front (upper) part of the upper arm 44. In the illustrated embodiment, the fourth fastener 64 includes a pin which is received in the through holes formed in the first projecting piece 36 and the upper arm 44 and engaged by the upper arm 44. The fourth fastener 64 thus has an axial line extending vertically.

A slot 38A extending in the fore and aft direction is formed is a rearmost part (the lowermost part) of the third projecting piece 38 of the front panel 13. The third projecting piece 38 is fixed to the connecting member 35 via a fifth fastener 65 at a rear end part where the slot 38A is formed. The fifth fastener 65 includes a welded nut welded to the lower surface of the connecting member 35 and a threaded bolt passed through the slot 38A to be threaded into the welded nut. The fifth fastener 65 thus has an axial line extending vertically. The slot 38A allows the fore and aft position of the front panel 13 relative to the vehicle body 4 to be adjusted when fixing the front panel 13 to the vehicle body 4.

As shown in FIG. 3, the second projecting piece 37 is fixed to the fixing portion 56 of the headlight 12 via a sixth fastener 66 and a seventh fastener 67 which are positioned on the rear end part (the upper part) thereof one behind the other. More specifically, the sixth fastener 66 consists of a pin received in a through hole formed in the second projecting piece 37 and a through hole formed in the outer fixing portion 56, and is engaged by the outer fixing portion 56. The seventh fastener 67 consists of a welded nut welded to the lower surface of the connecting member 35, and a threaded bolt threaded into the welded nut. The seventh fastener 67 fixedly secures the second projecting piece 37 and the outer fixing portion 56 to the connecting member 35 with the outer fixing portion 56 interposed between the second projecting piece 37 and the connecting member 35 of the vehicle body 4. The sixth fastener 66 and the seventh fastener 67 each have an axial line extending vertically.

Figure 10:
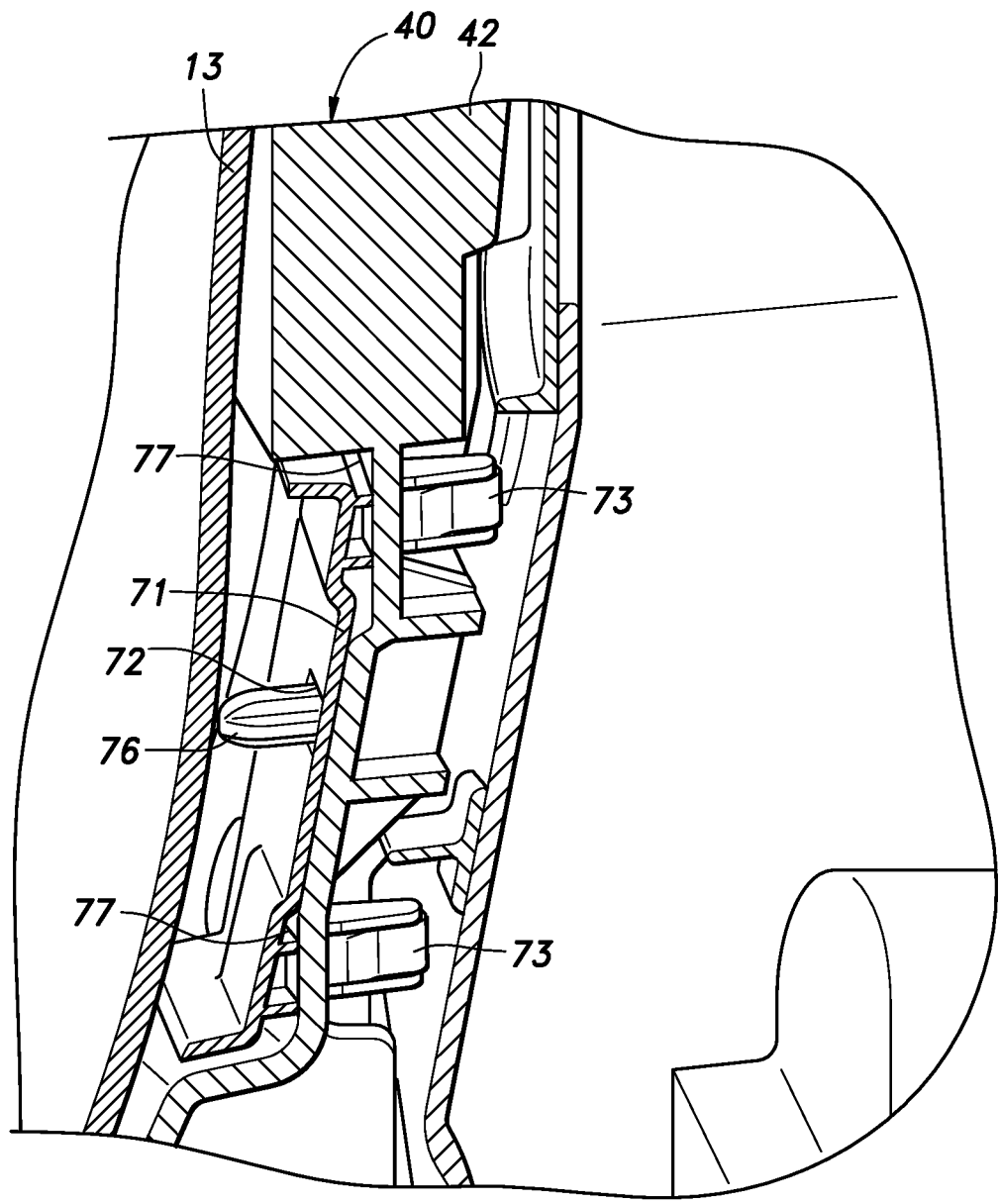
FIG. 10 is a sectional perspective view of the mounting structure of the headlight taken along line X-X in FIG. 6.

FIG. 10 is a sectional perspective view of the mounting structure of the headlight 12 taken along line X-X in FIG. 6. FIG. 11 is a perspective rear view of the front panel 13. As shown in FIGS. 6, 10, and 11, a pedestal 71 is integrally formed on a part of the front panel 13 adjacent to the opening 13A on an inboard side of the same. A positioning hole 72 for positioning the bracket 40 relative to the pedestal 71 is formed in a vertically middle part of the pedestal 71, and a pair of engagement claws 73 project rearward from an upper and a lower portion of the pedestal 71.

The part of the front surface of the vertical support portion 42 of the bracket 40 corresponding to the pedestal 71 is recessed rearward to receive the pedestal 71 therein. A positioning pin 76 protrudes integrally forward from a vertically middle point of this recess to be received in the positioning hole 72 of the pedestal 71.

The pedestal 71 can be correctly positioned relative to the bracket 40 by receiving the positioning pin 76 of the bracket 40 in the positioning hole 72, and is fixed to the bracket 40 by engagingly inserting the upper and lower engagement claws 73 into corresponding engagement holes 77 provided on the vertical support portion 42 of the bracket 40.

As shown in FIGS. 10 and 11, in the present embodiment, the pedestal 71 includes a pedestal plate 78 extending along the rear surface of the front panel 13 in parallel thereto in a spaced apart relationship, and a pair of connecting walls 79 (79A, 79B) connecting either side edge of the pedestal plate 78 to the rear surface of the front panel 13. The outboard connecting wall 79A is provided on the inboard edge of the opening 13A, and the inboard connecting wall 79B is integrally connected to an outboard edge of the third projecting piece 38 that extends to a lower part of the front panel 13. The positioning hole 72 is formed in the pedestal plate 78. The pedestal 71 thus adjoins the inboard edge of the opening 13A of the front panel 13, and has a wall (pedestal plat 78) which extends in parallel with the front panel 13 in a spaced apart relationship and in which the positioning hole 72 is formed. Owing to the presence of the pedestal 71, the positioning hole 72 can be formed without requiring any protrusion or hole to be formed on the front side of the front panel 13.

Figure 12C:
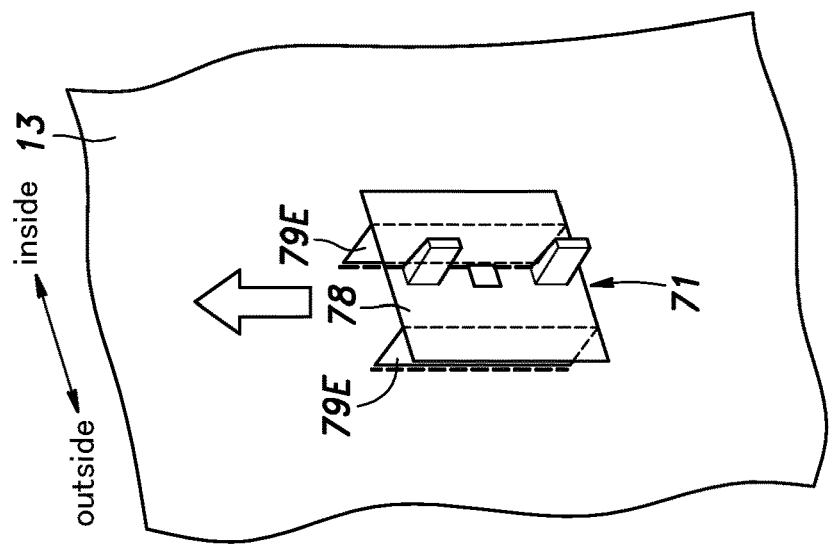
FIG. 12C is a view similar to FIG. 12A showing a second modified embodiment.
Figure 12B:
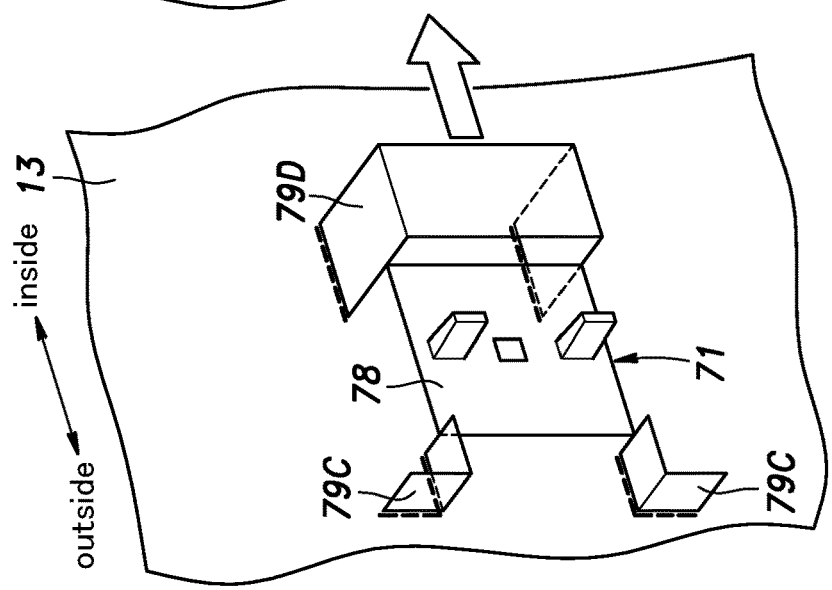
FIG. 12B is a view similar to FIG. 12A showing a first modified embodiment.
Figure 12A:
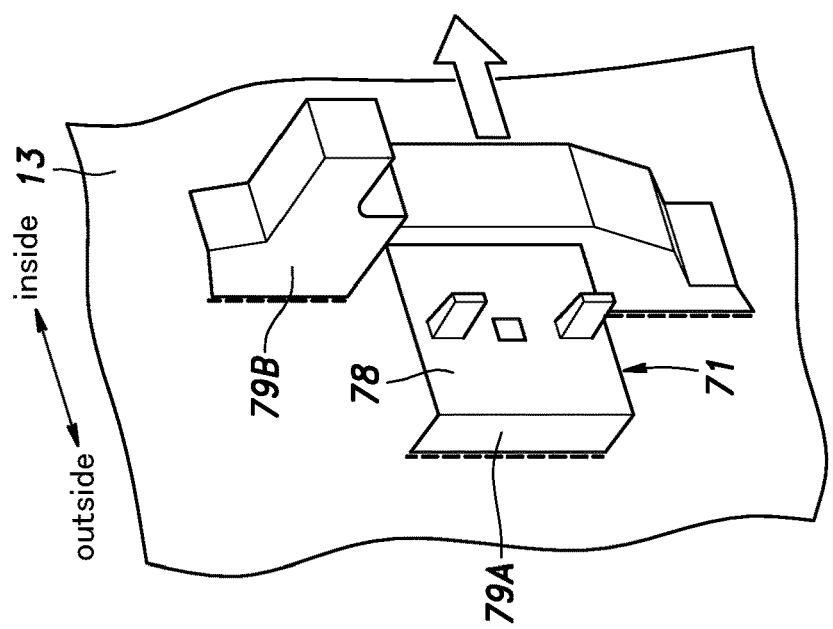
FIG. 12A is a schematic perspective view of a structure of a pedestal according to the embodiment.

FIG. 12A is a schematic view showing the structure of the pedestal 71 of the illustrated embodiment. The inboard connecting wall 79B is formed as a wall extending substantially over the entire height of the front panel 13, and is integrally connected to the base end part of the third projecting piece 38. In particular, there is a break in the part of the inboard connecting wall 79B corresponding to the pedestal plate 78. In other words, the space defined between the pedestal plate 78 and the rear surface of the front panel 13 is open on the inboard side thereof. Therefore, the pedestal 71 can be molded integrally with the front panel 13 by using a sliding mold part that can be withdrawn in the lateral direction when removing the molded product as indicated by the white arrow.

FIG. 12B illustrates an alternate arrangement for the pedestal 71. In this modified embodiment, the pedestal plate 78 of the pedestal 71 is supported by the front panel 13 by a pair of connecting columns 79C at the upper and lower ends of the outboard edge of the pedestal plate 78. The inboard edge of the pedestal plate 78 is connected to the front panel 13 at an upper and a lower end thereof via a pair of connecting walls 79D extending horizontally. In the illustrated embodiment, not exclusively, the free ends (rear ends) of the connecting walls 79D are connected to each other by a plate member extending in parallel with the pedestal plate 78 with a rearward offset. In this case also, the pedestal 71 can be molded integrally with the front panel 13 by using a sliding mold part that can be withdrawn in the lateral direction when removing the molded product as indicated by the white arrow.

FIG. 12C illustrates another alternate arrangement for the pedestal 71. In this modified embodiment, the pedestal 71 is joined to the rear surface of the front panel 13 by a pair of connecting walls 79E projecting rearward and extending in the vertical direction along either side edge of the pedestal plate 78. In the illustrated embodiment, each connecting wall 79E projects from a part of the pedestal plate 78 laterally offset from the corresponding side edge toward the center of the pedestal plate 78, but may also project from the corresponding lateral edge of the pedestal plate 78. In this case also, the pedestal 71 can be molded integrally with the front panel 13 by using a sliding mold part that can be withdrawn when removing the molded product in the vertical direction as indicated by the white arrow.

Figure 13:
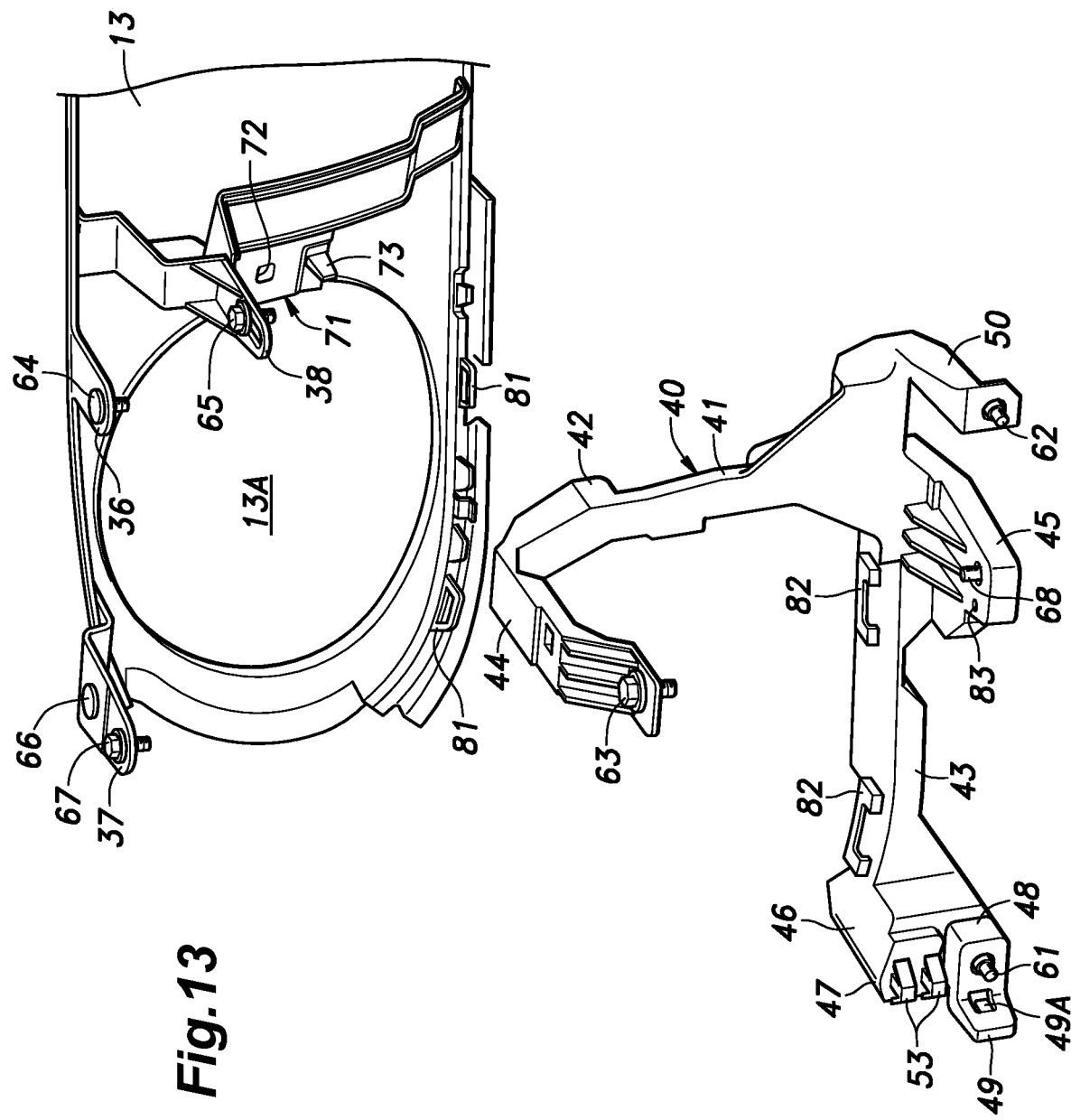
FIG. 13 is an exploded perspective rear view of the front panel and a bracket attached thereto.

FIG. 13 is an exploded perspective rear view of the front panel 13 and the bracket 40. It is to be noted that in FIG. 13, some of the features, such as the engagement holes 77, of the bracket 40 are omitted for simplicity. As shown in FIGS. 11 and 13, a pair of claws 81 project integrally rearward in a lower edge part of the front panel 13. Engagement features 82 corresponding to these claws 81 are provided on the front side of the lateral support portion 43 of the bracket 40. In the illustrated embodiment, each claw 81 is provided with an opening into which the corresponding engagement feature 82 snap fits therein.

As also shown in FIG. 4, a pin receiving hole 83 for receiving a pin 84 projecting from the lower surface of the headlight 12 for positioning the headlight 12 is formed in the lower arm 45 of the bracket 40. The lower arm 45 is also formed with a through hole which is configured to receive an eighth fastener 68. The eighth fastener 68 includes a threaded bolt which is inserted into the through hole of the lower arm 45 from below, and threaded in a threaded hole (not shown in the drawings) formed on the lower surface of the headlight 12. The positioning pin 84 (received in the pin receiving hole 83) and the eighth fastener 68 each have an axial line extending in the vertical direction. The positioning pin 84 projecting from the lower surface of the head light 12 may be threaded so as to be engaged by a nut after being passed through the pin receiving hole 83. The positioning pin 84 or the eighth fastener 68 serves as a fastener having a vertical axial line and fixing the lower side of the headlight 12 to the lower arm 45.

The eighth fastener 68 is inserted into the through hole of the lower arm 45 only after the headlight 12 is properly positioned (to be mounted to the front panel 13), but is shown in FIG. 13 for the convenience of description. The same is true with the other fasteners 61 to 67 shown in FIG. 13.

Figure 14:
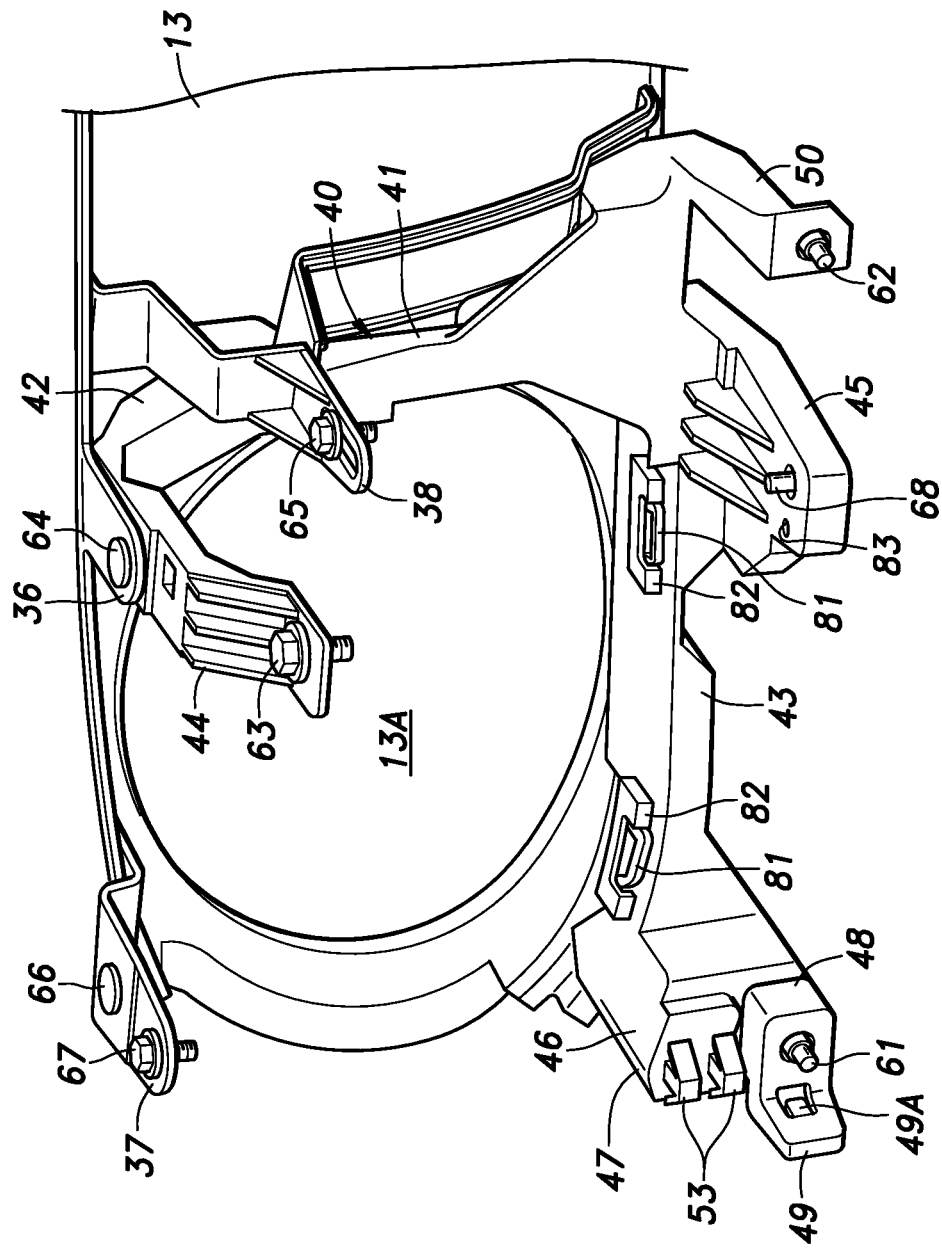
FIG. 14 is a perspective rear view of the front panel with the bracket attached thereto.

The assembly procedure for the headlight 12 and the front panel 13 is described in the following. FIG. 14 is a perspective rear view of the front panel 13 with the bracket 40 attached thereto. As shown in FIGS. 10 and 14, the positioning pin 76 is inserted into the positioning hole 72, and the bracket 40 is pushed forward from the rear side of the front panel 13 until the engagement features 82 are engaged by the claws 81.

Also, when the bracket 40 is pushed forward, the two engagement claws 73 of the front panel 13 engage the corresponding engagement holes 77 of the bracket 40, and the two claws 81 of the front panel 13 engage the corresponding engagement features 82 of the bracket 40. Thus, the bracket 40 is fixedly attached to the front panel 13, and is properly positioned thereto.

At this time, the first projecting piece 36 of the front panel 13 overlaps with the upper surface of the front part (base end part) of the upper arm 44 which is integrally formed with the bracket 40. As shown in FIG. 14, the pin of the fourth fastener 64 is inserted into the through hole of the first projecting piece 36 from above, and is engaged with the upper arm 44 of the bracket 40 with the result that the upper arm 44 is fixedly secured to the front panel 13 via the first projecting piece 36.

Figure 15:
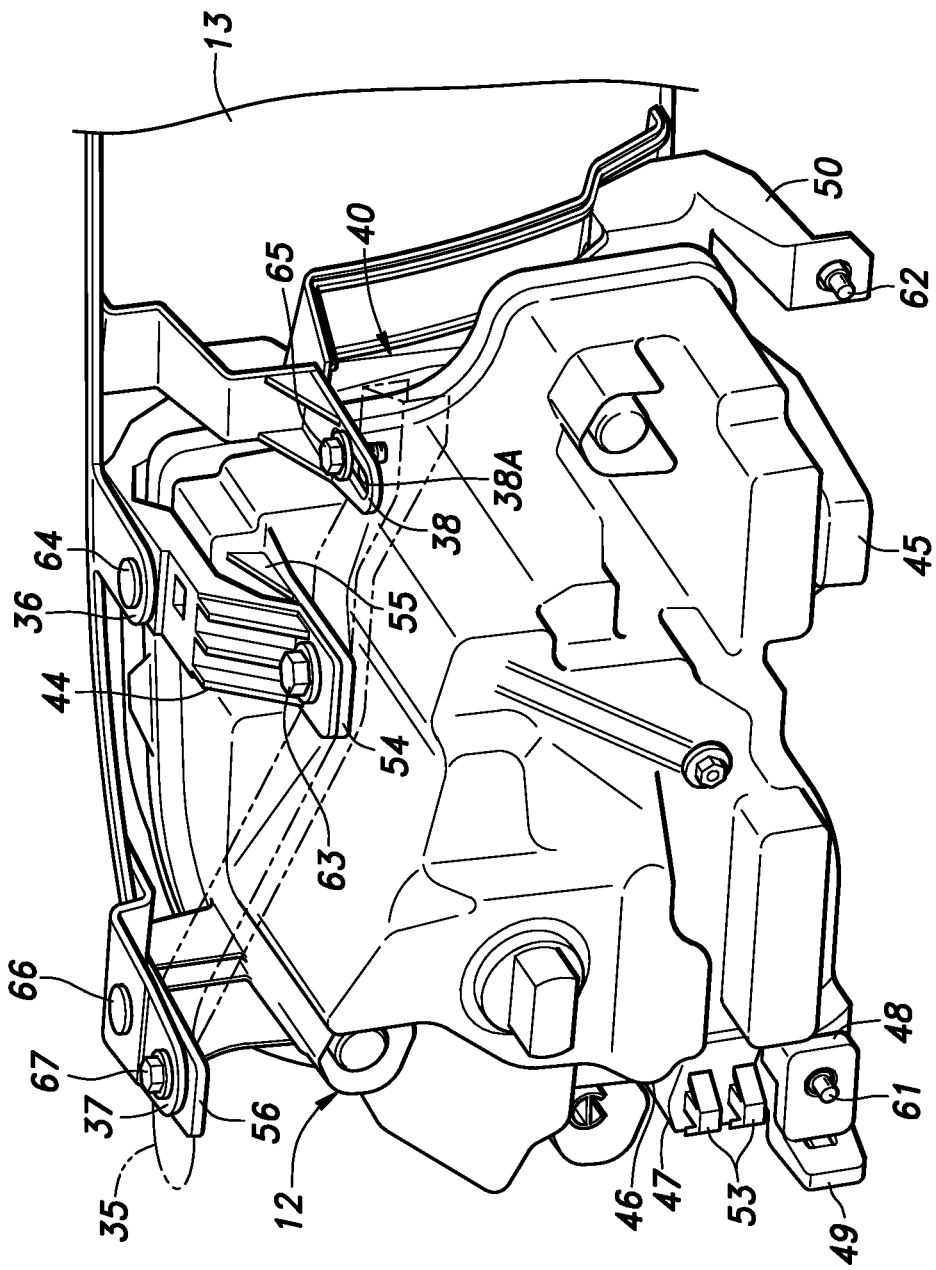
FIG. 15 is a perspective rear view of the front panel with the headlight and the bracket assembled thereto.

FIG. 15 is a perspective rear view of the front panel 13 with the headlight 12 assembled thereto. As shown in FIG. 15, the headlight 12 is slid sideways from the outboard side of the bracket 40 into the prescribed position, and is pushed forward in such a manner that the lens 12B of the headlight 12 is received in the opening 13A of the front panel 13. The final position of the headlight 12 is determined by the pin projecting from the lower surface of the headlight 12 being received in the pin receiving hole 83 (FIG. 14) of the lower arm 45 of the bracket 40.

At this time, the lower surface of the headlight 12 is supported by the lower arm 45 of the bracket 40, and the upper arm 44 of the bracket 40 overlaps with and in contact with the upper surface of the inner fixing portion 54 of the headlight 12. Further, the second projecting piece 37 of the front panel 13 overlaps with and in contact with the upper surface of the outer fixing portion 56 of the headlight 12. In addition, as shown in FIG. 7, the outer leg 46 (outer lower leg 48) of the bracket 40 is received by the tongue 51 of the headlight 12, and the outer arm 49 of the bracket 40 is engaged by the tongue 51 of the headlight 12 so that the headlight 12 is retained by the bracket 40.

As shown in FIG. 9, the upper arm 44 of the bracket 40 (which is located above the lower arm 45) passes above the front part of the headlight 12 at the front part thereof, and the intermediate part and the rear part of the upper arm 44 abut against the reinforcing ribs 55 of the headlight 12. This prevents a rearward tilting movement of the headlight 12. Thereafter, the position of the upper part of the headlight 12 is adjusted so that the pin of the sixth fastener 66 may be inserted into the through hole of the second projecting piece 37 from above so as to engage the outer fixing portion 56 of the headlight 12. Further, the pin of the eighth fastener 68 (FIG. 14) is inserted into the through hole of the lower arm 45 from below, and threaded into the threaded hole provided on the lower surface of the headlight 12.

As a result, as shown in FIG. 5, the headlight 12 is fixedly attached to the front panel 13 via the bracket 40 so as to face the opening 13A. The front surface of the lens 12B of the headlight 12 is substantially flush with the front surface of the front panel 13.

Thereafter, the front panel 13 with the headlight 12 attached thereto is assembled to the front part of the vehicle body 4. As shown in FIG. 15, the inner fixing portion 54 and the outer fixing portion 56 of the headlight 12 and the third projecting piece 38 of the front panel 13 extend rearward and have downwardly facing attachment surfaces that are to rest upon the connecting member 35. On the other hand, the tongue 51 of the headlight 12, and the outer upper leg 47 and the inner leg 50 of the bracket 40 have a mounting surface facing rearward. Therefore, the front panel 13 can be mounted to the vehicle body 4 by slidingly pushing the front panel 13 rearward into the vehicle body 4 from the front.

As the front panel 13 is pushed rearward during the assembling process, as shown in FIG. 3, the inner fixing portion 54 and the outer fixing portion 56 of the headlight 12 and the third projecting piece 38 of the front panel 13 ride over the connecting member 35, and positioned properly relative to the connecting member 35 to be fixedly attached thereto. Further, as shown in FIG. 4, the inner leg 50 of the bracket 40 abuts onto the front surface of the vertical member 33 of the front bulkhead 22. As shown in FIGS. 4 and 7, the outer upper leg 47 of the headlight 12 is fixed to the fender bracket 52 by the projecting claw 53. The tongue 51 of the headlight 12 is pushed by the outer lower leg 48 against the fender bracket 52. As a result, the front panel 13 is properly positioned and fixed relative to the vehicle body 4.

Once the front panel 13 is properly positioned, the bolt of the first fastener 61 is inserted into the through holes of the outer lower leg 48 and the tongue 51 from the front, and fastened to the welded nut of the fender bracket 52. Further, the threaded bolt of the second fastener 62 is inserted into the through hole of the inner leg 50 from the front, and fastened to the welded nut of the vertical member 33 of the front bulkhead 22.

As shown in FIG. 3, the threaded bolt of the third fastener 63 is inserted into the through holes of the upper arm 44 of the bracket 40 and the inner fixing portion 54 of the headlight 12 from above, and threaded into the welded nut of the connecting member 35. The threaded bolt of the fifth fastener 65 is inserted into the slot 38A of the third projecting piece 38 from above, and fastened to the welded nut of the connecting member 35. The threaded bolt of the seventh fastener 67 is inserted into the through holes of the second projecting piece 37 of the front panel 13 and the outer fixing portion 56 of the headlight 12 from above, and fastened to the welded nut of the connecting member 35. This concludes the attachment of the headlight 12 to the front panel 13, and the attachment of the front panel 13 to the vehicle body 4.

The functions and advantages of the various features of this vehicle body front structure are discussed in the following.

As shown in FIGS. 3, 4 and 15, the headlight 12 is attached to the front panel 13 via the bracket 40 including the part extending along the periphery of the opening 13A at least along the two sides thereof. In particular, the front panel 13 can be attached to the vehicle body 4 while the headlight 12 is fixedly positioned so as to oppose the opening 13A by the bracket 40. Therefore, when the front panel 13 is attached to the vehicle body 4, the front panel 13 does not interfere with the headlight 12. Thus, the assembly work can be performed both correctly and easily.

As shown in FIG. 10, the bracket 40 is provided with the positioning pin 76 projecting forward, and the engagement hole 77 opening forward near the positioning pin 76. As also shown in FIG. 13, on the back surface of the front panel 13 is provided the pedestal 71 formed with the positioning hole 72 for receiving the positioning pin 76, and the engagement claws 73 projecting rearward into the engagement holes 77 to be engaged thereby. Therefore, in spite of a relatively large weight, the headlight 12 can be supported by the front panel 13 owing to the firm engagement between the engagement claws 73 and the engagement holes 77. The bracket 40 can be accurately positioned relative to the front panel 13 owing to the engagement between the positioning pin 76 and the positioning hole 72.

As shown in FIGS. 9 and 14, the first projecting piece 36 projects rearward from the upper part of the front panel 13 along the upper surface of the bracket 40, and is fixed to the upper surface of the bracket 40. Therefore, the first projecting piece 36 accurately determines the vertical positioning of the front panel 13 relative to the bracket 40, and allows the bracket 40 to be firmly attached to the front panel 13.

As shown in FIGS. 13 and 14, the claws 81 project rearward from the lower part of the front panel 13, and the engagement features 82 for engaging the claws 81 are provided on the bracket 40. Thus, the engagement between the claws 81 and the engagement features 82 ensures a correct positioning and a firm connection in the lower part of the bracket 40 or the headlight 12 relative to the front panel 13.

As shown in FIG. 3 and FIG. 15, the second projecting piece 37 projects rearward from the upper part of the front panel 13 along the upper surface of the headlight 12, on the inboard side of the first projecting piece 36, and is fixedly attached to the upper surface of the headlight 12. Thus, the engagement between the second projecting piece 37 and the headlight 12 ensures a correct positioning and a firm connection in the upper and inboard part of the bracket 40 or the headlight 12 relative to the front panel 13.

As shown in FIGS. 6 and 9, the bracket 40 has the upper arm 44 that extends rearward from the upper part of the headlight support portion 41, and is positioned on and fixedly attached to the upper surface of the headlight 12. Thus, the upper arm 44 of the bracket 40 allows the headlight 12 to be accurately positioned relative to the front panel 13, and to be firmly attached to the front panel 13.

As shown in FIGS. 4, 14 and 15, the bracket 40 has the lower arm 45 extending rearward from the lower part of the headlight support portion 41, and is positioned on and fixedly attached to the lower surface of the headlight 12. Thus, the lower arm 45 of the bracket 40 allows the headlight 12 to be accurately positioned relative to the front panel 13, and to be firmly attached to the front panel 13.

As shown in FIGS. 7 and 15, the bracket 40 has the outer arm 49 extending rearward from the outboard part of the headlight support portion 41, and is provided with the claw 49A which is configured to engage the tongue 51 projecting from the side part of the headlight 12. Thus, the outer arm 49 of the bracket 40 allows the headlight 12 to be accurately positioned relative to the front panel 13, and to be firmly attached to the front panel 13.

As shown in FIGS. 3 and 9, the third projecting piece 38 projects rearward from the upper part of the front panel 13, and is fixedly attached to the vehicle body 4. The third projecting piece 38 allows the front panel 13 to which the headlight 12 is fixedly attached to be fixedly secured to the vehicle body 4 in an efficient manner.

As shown in FIG. 4, the inner leg 50 projects from the lower and inboard part of the bracket 40, and is fixedly secured to the vertical member 33 of the front bulkhead 22. Thus, the front panel 13 to which the headlight 12 is already integrally attached can be fixedly secured to the front bulkhead 22 via the inner leg 50 of the bracket 40. Since the inner leg 50 is provided in the lower portion of the bracket 40, the headlight 12 which is a relatively heavy object can be supported by the bracket 40 in a stable manner.

As shown in FIG. 4 and FIG. 7, the bracket 40 is provided with the outer leg 46 extending rearward along the lower outboard side of the headlight 12, and fixedly secured to the inner surface of the front fender 9 of the vehicle body 4 via the fender bracket 52. Thus, the front panel 13 to which the headlight 12 is already integrally attached can be fixedly secured to the front fender 9. Since the outer leg 46 is provided in the lower portion of the bracket 40, the headlight 12 which is a relatively heavy object is can be supported by the bracket 40 in a stable manner.

As shown in FIGS. 3 and 9, the third projecting piece 38 of the front panel 13 is provided with the slot 38A which is elongated in the fore and aft direction so that the positioning of the front panel 13 fitted with the headlight 12 relative to the vehicle body 4 can be adjusted.

As shown in FIG. 15, the inner fixing portion 54 and the outer fixing portion 56 are provided on the upper parts of the headlight 12 for attaching the headlight 12 to the vehicle body 4. The outer fixing portion 56 is positioned at a higher position than the inner fixing portion 54 so that the headlight 12 can be firmly supported against a rotational movement. Also, the placing of the headlight 12 in the prescribed position of the front panel 13 from the outboard direction can be facilitated.

As shown in FIGS. 11 and 12, the pedestal 71 includes the pedestal plate 78 extending along the rear surface of the front panel 13, and the connecting walls 79 connecting the pedestal plate 78 to the front panel 13. The connecting walls 79 allow the pedestal 71 to be firmly secured to the front panel 13 so that the positioning accuracy of the positioning pin 76 is improved. The headlight 12 is a relatively heavy object, but can be supported by the pedestal 71 via the engagement claws 73 in a stable manner. In addition, a precise positioning by the positioning pin 76 and the positioning hole 72 can be ensured.

As shown in FIGS. 13 and 15, the bracket 40 has a substantially L shape in front view so that the outboard side thereof is fully exposed. Therefore, the headlight 12 can be easily installed onto the bracket 40 from the outboard side without any obstruction. The bracket 40 is has a substantially channel shape (C shape) in side view so that the headlight 12 can be held by the bracket 40 from above and below, Therefore, the headlight 12 can be firmly secured in position by the bracket 40, and can be accurately positioned by the bracket 40.

The present invention has been described in terms of a specific embodiment, but is not limited by such an embodiment, and can be modified in various ways without departing from the scope of the present invention. For instance, although the foregoing embodiment was applied to a four-wheeled motor vehicle 1, the present invention is applicable to a two-wheeled vehicle and a three-wheeled vehicle. The present invention can also be applied to internal combustion engine vehicles, hybrid vehicles, plug-in hybrid vehicles, electric vehicles and the like. Moreover, the headlight was assembled to the bracket after the bracket was assembled to the front panel, but the bracket may be assembled to the front panel after assembling the headlight to the bracket.

The invention claimed is:

1. A vehicle body front structure, including a front hood covering a front space defined in a front part of a vehicle body from above, a front panel laterally extending along and under a front edge of the front hood and facing substantially in a fore and aft direction, the front panel defining an opening in an outboard part thereof, and a headlight facing the opening of the front panel from behind the front panel,
    wherein the headlight is attached to a rear side of the front panel via a bracket which is positionally fixed to a periphery of the opening, and
    a lower part of the bracket on an inboard side of the headlight is provided with an inner leg projecting rearward to be fixed to a vertical member of a front bulkhead of the vehicle body formed as a frame structure.

2. The vehicle body front structure according to claim 1, wherein the bracket is provided with a positioning pin projecting forward, and an engagement hole which is open toward a front of the vehicle body and located adjacent to the positioning pin, and
    the rear side of the front panel is provided with a pedestal having a positioning hole configured to receive the positioning pin, and an engagement claw projecting rearward into the engagement hole to be engaged by the bracket.

3. The vehicle body front structure according to claim 2, wherein an upper part of the front panel is provided with a first projecting piece projecting rearward along an upper surface of the bracket to be secured to the bracket.

4. The vehicle body front structure according to claim 3, wherein a lower part of the front panel is provided with a claw projecting rearward, and the bracket is provided with an engagement feature configured to be engaged by the claw.

5. The vehicle body front structure according to claim 3, wherein an upper part of the front panel on an outboard side of the first projecting piece is provided with a second projecting piece extending rearward along an upper surface of the headlight to be secured to the headlight.

6. The vehicle body front structure according to claim 2, wherein the pedestal includes a pedestal plate extending along a rear surface of the front panel, and a connecting wall connecting the pedestal plate to the front panel.

7. The vehicle body front structure according to claim 1, wherein the bracket is provided with a headlight support portion positioned on a periphery of a front part of the headlight, and an upper arm extending rearward from an upper part of the headlight support portion, the upper arm being positioned onto the upper surface of the headlight to be fixed thereto.

8. The vehicle body front structure according to claim 1, wherein the bracket is provided with a headlight support portion positioned on a periphery of a front part of the headlight, and a lower arm extending rearward from a lower part of the headlight support portion, the lower arm being positioned onto a lower surface of the headlight to be fixed thereto.

9. The vehicle body front structure according to claim 1, wherein the bracket is provided with a headlight support portion positioned on a periphery of a front part of the headlight, and an outer arm extending rearward from an outboard part of the headlight support portion, the outer arm being provided with a claw configured to engage a tongue projecting from a side of the headlight.

10. The vehicle body front structure according to claim 5, wherein an upper part of the front panel is provided with a third projecting piece projecting rearward to be fixed to the vehicle body.

11. The vehicle body front structure according to claim 10, wherein the third projecting piece of the front panel is formed with a slot for permitting positional adjustment of the front panel relative to the vehicle body.

12. The vehicle body front structure according to claim 1, wherein a lower part of the bracket on an outboard side of the headlight is provided with an outer leg projecting rearward to be fixed to an inner surface of a front fender of the vehicle body via a fender bracket.

13. The vehicle body front structure according to claim 1, wherein an upper part of the headlight is provided with an inner fixing portion and an outer fixing portion for fixing the headlight to the vehicle body, the outer fixing portion being positioned higher than the inner fixing portion.

14. The vehicle body front structure according to claim 1, wherein the bracket has a substantially L shape in front view, and a substantially channel shape having an open side facing rearward in side view.

15. The vehicle body front structure according to claim 1, wherein the bracket comprises a lateral support portion extending along a lower side of the opening and a vertical support portion extending vertically upward from the lateral support portion so as to extend along an inboard side of the opening, and
    wherein the bracket is fixed to the front panel at the lateral support portion and the vertical support portion.

16. The vehicle body front structure according to claim 15, wherein the bracket further comprise an upper arm extending rearward from an upper end of the vertical support portion and a lower arm extending rearward from the lateral support portion,
    a rear end of the upper arm is fixed to an upper side of the headlight,
    and the lower arm is fixed to a lower side of the headlight via a fastener having a vertical axial line.

17. The vehicle body front structure according to claim 16, wherein the front panel is provided with a first projecting piece projecting rearward from an upper part thereof to be fixed to the upper arm.

18. The vehicle body front structure according to claim 17, wherein the front panel is provided with a second projecting piece projecting rearward from an upper part thereof on an outboard side of the first projecting piece to be fixed to the headlight and the vehicle body.

19. The vehicle body front structure according to claim 18, wherein the front panel is provided with a third projecting piece projecting rearward from an upper part thereof on an inboard side of the first projecting piece to be fixed to the vehicle body.

* * * * *